United States Patent [19]

George et al.

[11] Patent Number: 4,888,691
[45] Date of Patent: Dec. 19, 1989

[54] METHOD FOR DISK I/O TRANSFER

[75] Inventors: Paul L. George, Westboro; David M. Waxman, Framingham; Randall T. Sybel, Blackstone; Elliot H. Mednick, Millbury; Kevin J. O'Brien, Norfolk; Joseph M. Spatara, Ashland, all of Mass.

[73] Assignee: Prime Computer, Inc., Natick, Mass.

[21] Appl. No.: 166,515

[22] Filed: Mar. 9, 1988

[51] Int. Cl.⁴ .............................................. G06F 13/38
[52] U.S. Cl. .................... 364/300; 364/200;
364/236.2; 364/248.1; 364/284; 364/284.2
[58] Field of Search ....................... 364/200, 300, 900

[56] References Cited

U.S. PATENT DOCUMENTS 4,262,332  4/1981  Bass et al. ..................... 364/200
4,649,473  3/1987  Hammer et al. ................ 364/200

Primary Examiner—Raulfe B. Zache
Attorney, Agent, or Firm—Wolf, Greenfield & Sacks

[57] ABSTRACT

A disk control system offloads to the disk controller much of the overhead associated with disk operations and makes the CPU available for other work. A command block that fully specifies a user request for a disk operation is forwarded to the disk memory unit. The command block contains a unique identifier for tracking of user requests. User requests are executed by the disk memory unit in an order that is most efficient for the disk drive system. The status of a user request is communicated to the CPU via an interrupt and a status block containing the unique identifier. The status block indicates status conditions such as command read, completion and DMA channel request. The disk driver contains a work queue for user requests that have not been forwarded to the disk memory unit and a pending queue for user requests that are awaiting completion by the disk memory unit. By manipulation of the work queues and pending queues, the disk controller can be automatically reinitialized when an error occurs. The disk driver monitors the time that each user request is on the pending queue in order to detect failures of the disk memory unit.

53 Claims, 24 Drawing Sheets

CHAIN—THE NUMBER OF CHANNELS TO USE > 1.
CHANNEL— DMA CHANNEL ADDRESS.

INITIALIZE AND INTERRUPT COMMAND

|        | |< 8 BITS >|< 8 BITS >| |
|--------|---|---|---|
| WORD 1 | |< <0020> >| |
| WORD 2 | |< 0 >|< ICOP INTERRUPT >| |
| WORD 3 | |< VECTOR LOCATION >| |
| WORD 4 | |< 0 >|< STATUS >| |
| WORD 5 | |< VECTOR LOCATION >| |
| WORD 6 | |< 0 >|< DMA >| |
| WORD 7 | |< BLOCK LOCATION >| |

*FIG. 5A*

DOWNLINE LOAD COMMAND

|        | |< 16 BITS >| |
|--------|---|---|
| WORD 1 | |< <1020> >| |
| WORD 2 | |< BLOCK LENGTH >| |

BLOCK LENGTH—THE LENGTH OF THE DMA BLOCK (USUALLY 1040 WORDS).

*FIG. 5B*

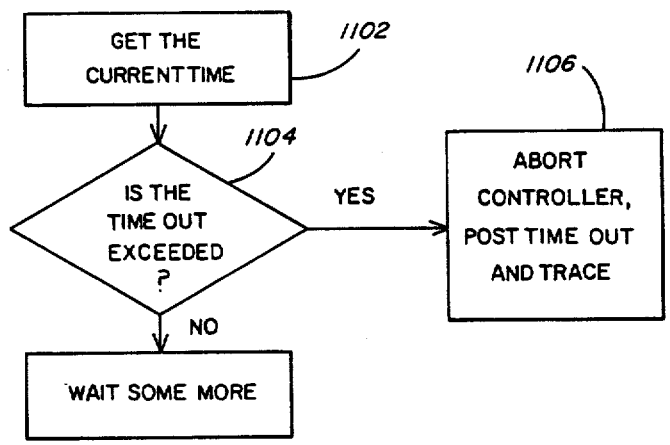
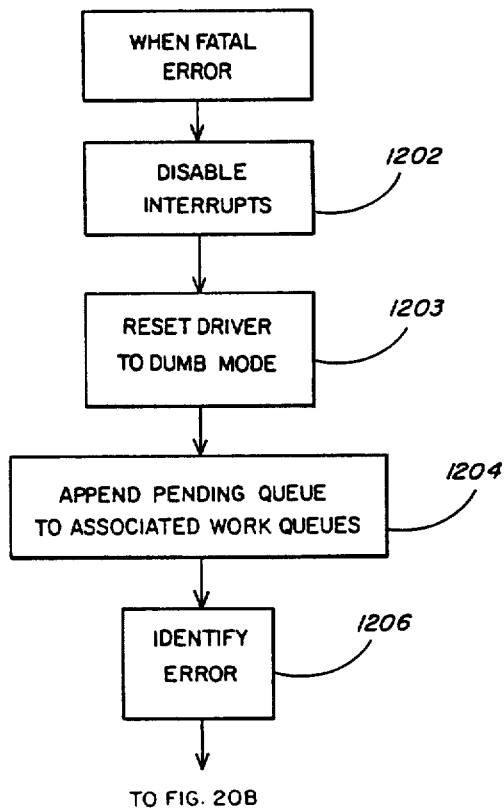
FIG. 19
FIG. 20A

METHOD FOR DISK I/O TRANSFER

FIELD OF THE INVENTION

This invention relates to a computer system having one or more magnetic disk storage units and, more particularly, to a method for efficient transfer of information between a central processing unit and the disk storage units.

BACKGROUND OF THE INVENTION

Present day computer systems usually include one or more magnetic disk units for bulk storage. In a multiuser system, each user has the capability to read records from and write records to the disk units. Since disk operations take appreciable time in comparison with other computer operations, the efficiency with which disk operations are performed significantly affects overall system performance.

In general, the portion of a computer system associated with a disk unit includes the disk and associated drive hardware, disk controller software associated with the disk drive, disk driver software in the central processing unit and a communication channel between the disk driver and the disk controller. The disk driver receives requests from users via the operating system and communicates the requests through the communication channel to the disk controller. The disk controller receives the requests from the disk driver, provides the necessary signals to the disk drive hardware and returns information to the disk driver.

A user disk read or write request may involve several operations on a machine level. In prior art systems, the disk controller received only one instruction, such as SELECT, SEEK, READ or WRITE, at a time. Until the previous command was executed, the controller did not receive the next command. This mode of operation is inefficient because the CPU is required to perform several operations during which time other user disk requests are required to wait. In addition, the disk controller is not necessarily operating in the most efficient manner since it must execute each command in the order specified by the disk driver.

SUMMARY OF THE INVENTION

According to the present invention, these and other objects and advantages are achieved in a method for executing user requests for work by a disk memory unit in a computer system including a central processing unit (CPU) having a main memory and a disk memory unit interconnected to the CPU. The method comprises the steps of; for each user request received, placing a queue block representative of the user request on a work queue; constructing a command block for each queue block placed on the work queue; forwarding each command block from the CPU to the disk memory unit for execution; after each command block has been forwarded to the disk memory unit for execution, transferring the associated queue block from the work queue to a pending queue; executing the user requests represented by each command block in an order determined by the disk memory unit; and removing each queue block from the pending queue after the disk memory unit has completed the associated user request. The command block forwarded to the disk memory unit contains all the information necessary for execution of a use request. The work queue and the pending queue maintain records of user requests received and user requests forwarded to the disk memory unit for execution, while permitting control of disk memory operations to be transferred to.the disk memory unit.

Each queue block in the work queue and in the pending queue and each command block has a unique identification number which links it to a user request. As a result, user requests can be executed by the disk memory unit in an order that is unknown to the CPU.

A status block indicative of the status of a user request is constructed by the disk memory unit and is forwarded to the CPU. The status block includes an interrupt type, the identification number received in the associated command, and status words which indicate errors and other information. The disk memory unit notifies the CPU via an interrupt and the status block when a command has been read. Each time the CPU is notified that a command block has been read, the work queue is checked for additional user requests. When additional user requests are found on the work queue, the CPU is notified to process the user requests and forward the required command blocks to the disk memory unit. As a result, user requests are quickly forwarded to the disk memory unit and the CPU is made available for other work.

The disk memory unit also requests the CPU via an interrupt and the status block to set up a data transfer channel when the disk memory unit is ready for transfer of data associated with a specified user request to or from the disk memory unit. After a user request has been completed by the disk memory unit, the CPU is notified via an interrupt and the status block that the user request has been completed.

According to another aspect of the invention, the time that each queue block has been on the pending queue is monitored and an error condition is generated when any of the queue blocks has been on the pending queue for longer than a maximum allowed time. The error condition causes the disk memory unit to be reinitialized. The work queue and the pending queue each have an associated head and a tail. Preferably, the step of reinitializing the disk memory unit includes the step of appending the queue blocks in the pending queue to the head of the associated work queue and initializing the pending queue to zero. As a result, user requests previously forwarded to the disk memory unit that would otherwise have been lost when the disk memory unit was reinitialized, are executed in the order that they were received. Reinitializing the disk memory unit includes the steps of converting from an intelligent mode of operation to a degraded, or dumb, mode of operation, downloading an intelligent mode disk controller program from the CPU to the disk memory unit and resuming operation in the intelligent mode. Downloading of the disk controller program and resuming operation in the intelligent mode can occur automatically without the knowledge of or intervention by the user.

The step of constructing a command block includes the step of writing command information to a specified location in main memory, and the step of forwarding each command block from the CPU to the disk memory unit includes the step of notifying the disk memory unit to read command information from the specified location in main memory. The step of constructing a status block includes the step of writing status information to a specified location in main memory, and the step of forwarding the status block from the disk memory unit to the CPU includes the step of notifying the CPU via an interrupt read the status block from the specified location in main memory.

The status block is forwarded to the CPU by means of a vectored interrupt. The interrupt sets a flag indicating that the status block has been forwarded to a specified location in memory and is available for access. The disk driver is able to identify spurious interrupts, to record an error and to continue operation. The disk memory unit has the capability of sensing specified internal and external events and error conditions unrelated to any user request and forwarding them to the CPU via the status block. The specified events are logged by the CPU, or processed in a predetermined manner. Unrecoverable errors result in the disk memory unit being automatically reinitialized as described above, and operation is resumed without intervention by the user.

The disk driver includes a trace function that can be selectively enabled for tracking system operations and errors. When the trace function is enabled, a real time entry is made in a trace table for each command block, each interrupt and each error that is handled by the disk driver. The trace table thus contains a traffic record useful for diagnostic purposes.

According to another aspect of the invention, there is provided a method for executing user requests for work by a disk memory unit in a computer system including a central processing unit (CPU) having a main memory and a disk memory unit interconnected to the CPU. The method comprises the steps of: for each user request, forwarding a command block that fully specifies the user request from the CPU to the disk memory unit, the command block containing a unique identifier; resuming normal operation of the CPU until notified by the disk memory unit of the status of the specified user request; executing the user request specified by the command block at a time determined by the disk memory unit; and notifying the CPU of the status of the specified user request via an interrupt and a status block containing the unique identifier. For user requests requiring data transfer to or from the disk memory unit, the method further includes the steps of notifying the CPU via an interrupt and the status block containing the unique identifier to set up a data transfer channel when the disk memory unit is ready for transfer of data associated with the specified user request, and transferring data associated with the specified user request to or from the disk memory unit under control of the disk memory unit.

BRIEF DESCRIPTION OF THE DRAWINGS

For a better understanding of the present invention together with other and further objects, advantages and capabilities thereof, reference is made to the accompanying drawings which are incorporated herein by reference and in which:

FIG. 5A illustrates the format of an INITIALIZE AND INTERRUPT command;

FIG. 5B illustrates the format of a DOWNLINE LOAD command;

FIG. 19 is a flow diagram illustrating the routine for processing a clock interrupt;

FIGS. 20A and 20B are flow diagrams illustrating the operation of the ABORT CONTROLLER routine.

DETAILED DESCRIPTION OF THE INVENTION

Figure 1:
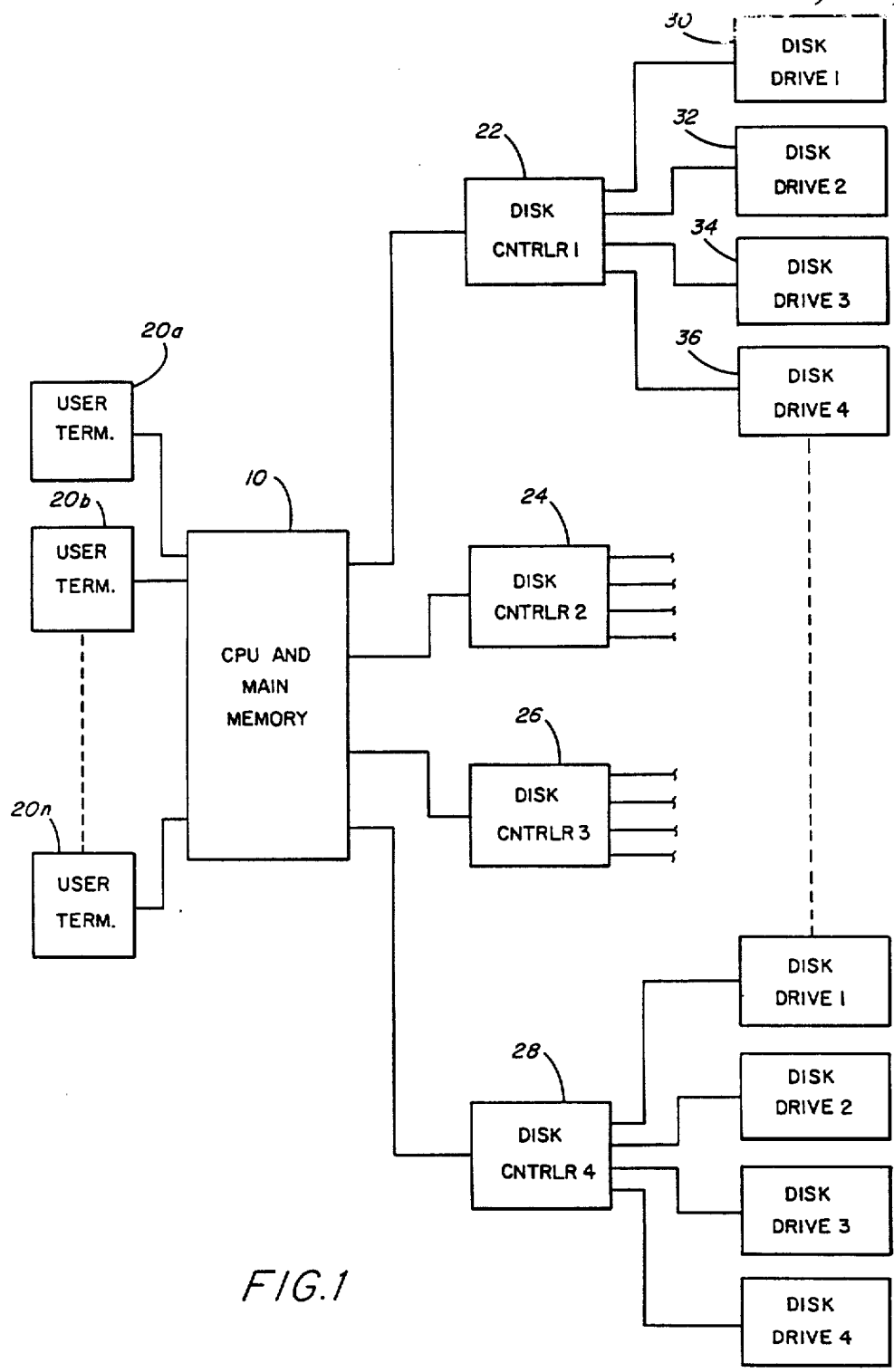
FIG. 1 is a block diagram of a computer system incorporating the present invention.

A computer system incorporating the present invention is shown in block diagram form in FIG. 1. A computer 10 includes a central processing unit (CPU) and a main memory. A plurality of user terminals 20a, 20b–20n may communicate with and utilize the computer 10. The computer 10 is connected to one or more disk memory units. In the present example, the computer 10 is connected to four disk controllers 22, 24, 26, 28, each of which handles four disk drives 30, 32, 34, 36. The maximum number of disk drives per controller depends on the design of the disk controller. The system is designed to handle up to eight disk controllers, each having eight disk drives. In the computer 10, an operating system includes a disk driver program for each disk controller. Each disk controller 22, 24, 26, 28 includes a disk controller program which communicates with the respective disk driver program in the CPU 10.

Figure 2:
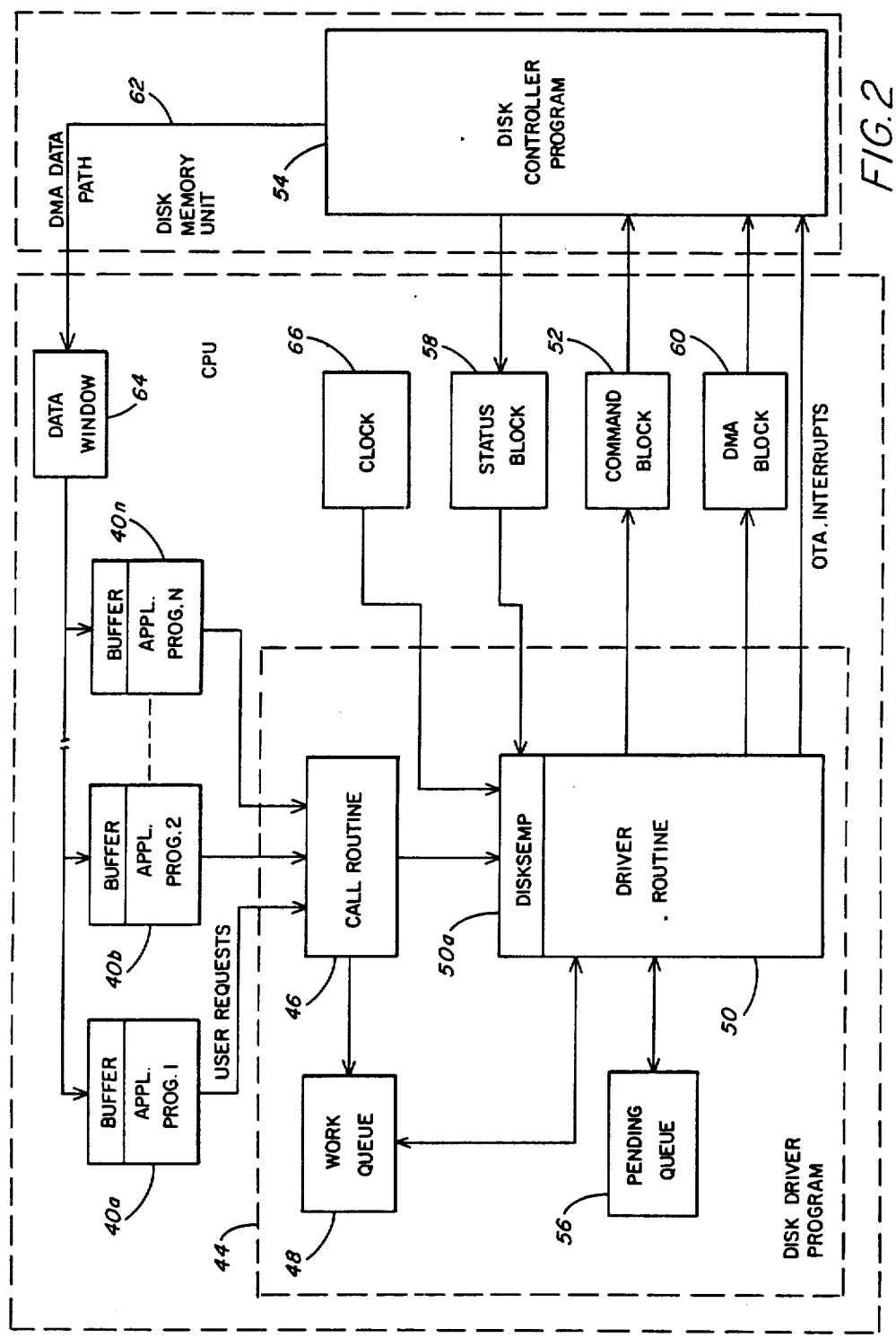
FIG. 2 is a block diagram illustrating the interrelationship of software elements in the system of the present invention.

The interrelationship of the disk driver program, the disk controller program for a single disk controller and user application programs is shown in FIG. 2. A plurality of application programs 40a, 40b–40n run in a time-shared manner on computer 10. When the application programs 40a, 40b–40n require work to be done by the disk memory units, user requests are forwarded to a disk driver program 44 that is part of the operating system. The user requests are processed by a call routine 46 in the driver program 44. The call routine uses each request as a set of arguments to construct a user disk request queue block that is placed on a work queue 48. A driver routine 50 is notified by the call routine via a disk semaphore 50a that a user request has been received.

The driver routine 50 accesses user request queue blocks in the work queue 48 and constructs command blocks 52 that fully specify the user request. The command blocks 52 are forwarded to a disk controller program 54 in the disk memory unit. After the command block is forwarded to the disk controller program 54, the corresponding user request queue block is transferred by the driver routine 50 from the work queue 48 to a pending queue 56 until the user request is completed.

The disk controller program 54 communicates the status of the user request to the disk driver program 44 via a status block 58. The status block 58 is forwarded to the driver routine 50 by an interrupt which notifies the disk semaphore 50a. The status block 58 is used to indicate that a command block 52 has been read and, subsequently, the status block 58 is used to request setup of a DMA data transfer. The driver program 44 then forwards a DMA block 60 specifying the DMA channel information to the disk controller program 54. The actual data transfer occurs via a DMA data path 62 through a data window 64 in the CPU to a buffer in the specified application program 40a, 40b–40n. After completion of the data transfer, the disk controller program 54 notifies the driver program 44 via the status block 58 that the user request has been completed. A CPU clock 66 interrupts the driver routine 50 via the disk semaphore 50a at periodic intervals for timing each operation and generating an error condition when a timeout occurs. The necessary data structures and operating routines are described in detail hereinafter.

The purpose of the disk control subsystem of the present invention is to generally increase the overall throughput of disk I/O transfers. The efficiency of the disk subsystem is increased by the following features. (1) All pertinent information about each command is transmitted to the disk controller as soon as possible. This permits the disk controller to make intelligent decisions about how it will handle each and every command. (2) The queuing algorithm that governs the disk seeking order is performed on the disk controller. (3) Retry operations in reading or writing are performed by the disk controller rather than the disk driver program associated with the CPU. (4) Error correction is performed to the extent possible by the disk controller. (5) The disk controller can accept multiple commands for the same disk driver, thereby freeing the disk driver software for other operations in a shorter time. (6) The channel program overhead is offloaded to the disk controller.

The disk controller has the capability to receive and queue multiple requests. The controller performs its own SEEK optimization. Error correction is performed automatically after a prescribed number of unsuccessful attempts to read or write a record.

In order to initialize the disk control subsystem the disk controller program must be downline loaded to the disk controller. The operating system in the CPU reads the controller program from the system disks and sends it to the controller. When the entire program is sent to the controller successfully, the downline load is complete.

The basic control sequence between the disk driver and the disk controller is through channel order packets of different types. The different channel order types are as follows: (1) initialize; (2) downline load; (3) command; (4) status; (5) DMA. Each of the channel orders is explained in detail hereinafter. The link between the driver and the controller is a series of command blocks sent to the controller by the driver and a series of status blocks returned by the controller to the CPU through the driver. The status blocks contain interrupt codes which are used to sequence disk requests to completion.

COMMUNICATION PROTOCOL

The protocol for communication between the CPU and the disk controller is an asynchronous communication protocol. Commands and other parameters are passed by a non-interruptible, high speed data transfer (DMT) and data is transferred by direct memory access (DMA). The communication protocol is structured to allow the disk controller to obtain all the pertinent information about each command, such as READ or WRITE, at one time, and thereby allow the controller microprocessor to make intelligent decisions about how it will handle each command. The controller returns data to the CPU in record units only, except for status information.

The interface protocol consists of a handshaking sequence between the CPU and the disk controller under which communication and data blocks are passed between the two. Data words known as OTA's (output through register A) are used by the CPU to initiate an action by the controller, and interrupts are used by the controller to notify the CPU that an action has been completed. As noted above, the communication blocks used in the protocol fall into one of the following five categories: (1) initialize block; (2) downline load block; (3) command block; (4) status block; (5) DMA block. The initialize block and downline load block are used by the CPU in order to load the controller program into the disk controller and switch the controller from a non intelligent mode into the intelligent mode. The command blocks are sent from the CPU to the controller and define a command to be executed by the controller. The status blocks are sent from the controller to the CPU and contain status information. The DMA blocks are sent from the CPU to the controller and contain DMA channel and chain information to be used by the controller for DMA data transfer. All of these communication blocks are transferred between the CPU and the controller using DMT transfers.

OTA's

The disk driver notifies the disk controller of required operations by using OTA's. There are five OTA's defined for this purpose, OTA 10, 11, 12, 13 and 00. The controller must be nonbusy to programmed input/output to accept an OTA. Since the controller can go busy at any time, the CPU must attempt an OTA and if the controller is busy, either constantly attempt the OTA or try again later.

An OTA 10, 11, 12 or 13 is used to send the starting address of a command block. On receipt of an OTA, the controller fetches the command block from memory. The controller remains busy while fetching the command block. After the command block is fetched, the controller sends a COMMAND READ interrupt acknowledging that it received the command and that the operating system can now modify the command block.

An OTA 00 is used by he disk driver as a means to acknowledge a controller's interrupt. With an OTA 00, a specified register contains a code that informs the controller to do one of the following actions: (1) continue; (2) abort command; (3) reattempt command.

An OTA 00 CONTINUE or ACKNOWLEDGE must be sent to the disk controller in response to any interrupt unless another type of response (abort or reattempt) is being sent. This informs the controller that it can modify memory locations for another interrupt. An OTA 00 CONTINUE or ACKNOWLEDGE that is received by the disk controller at an inappropriate or unexpected time causes the controller to set an ERROR interrupt, with the status block indicating an illegal command.

The ABORT notify can be sent to the disk controller in response to any interrupt except COMPLETION or UNSOLICITED interrupts. The controller stops processing of the aborted command and generates a COMPLETION interrupt with the aborted ID and with the status block indicating it was aborted. If an ABORT code is sent in response to a COMPLETION or UNSOLICITED interrupt, the controller generates an ERROR interrupt with a protocol error bit set.

The REATTEMPT notify can be sent in response to any interrupt. This notify tells the controller to reattempt the last completed function (for example, DMA transfer of buffer, command block fetch, DMT and interrupt, etc.). If a data buffer has been transferred in either direction since the last interrupt for this ID, the buffer should also be retransferred. Table 1 shows the responses of the disk controller to an OTA 00 with operation code as a function of interrupt type.

TABLE 1

Controller Responses to an OTA '00

| Interrupt Type | OTA '00 Code | | |
|---|---|---|---|
| | Abort | Continue | Re-Attempt |
| Command Read (1) | Abort ID | Continue | Reread command |
| Transfer Req. (2) | Abort ID | Transfer Data | Repeat Int. |
| Buffer Acq. (3) | Abort ID | Continue | Repeat DMA |
| Completion (4) | Report Error | Completed | * |
| Error (5) | Abort ID | Completed | * |
| Unsolicited (6) | Report Error | Continue | Repeat Int. |
| Return Controller Information (7) | Report Error | Completed | Repeat Int. |
| Startup (8) | Revert to dumb mode | Continue | Repeat Int. |

*Note:
The controller may either reattempt the Completion interrupt (most commands) or back up to the Transfer Request and reattempt from there (Read, Dump).

If the disk controller receives any OTA other than an OTA 00, 10, 11, 12 or 13, it sends an ERROR interrupt with the status block indicating an illegal command. An OTA 00 with an illegal notify code or an OTA 10, 11, 12 or 13 with a bad OP code, are also reasons for an ERROR interrupt.

Command Block

Figure 3:
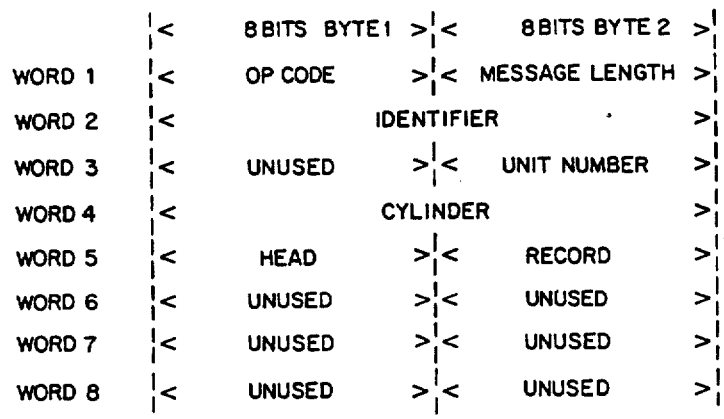
FIG. 3 illustrates the data structure of a command block in the system of the present invention.

The command block contains all the necessary information for the disk controller to execute a user request. The general format for the command block is shown in FIG. 3. Every command block includes an op code, a message length and an identifier as standard data fields. The command op codes and associated functions are listed in Table 2. The message length contains the number of the last word of the command that contains meaningful information. The remaining data fields in the command differ, depending on the type of command. The additional information contained in each command is specified hereinafter in the descriptions of each command. The unit number is a binary encoded disk unit number. The cylinder is the seek target cylinder. The head is the physical head number of the disk. The record is the physical record number on the disk. Other information associated with specific commands is described hereinafter.

Every command block that is issued to the controller by the disk driver has a unique identifier number (ID) as a part of the block. The unique identifier associated with each command block remains with that particular command while it is being executed by the controller. Upon completion of each command, the controller communicates with the disk driver via a status block message containing the unique identifier. The unique identifier has two purposes: (1) The identifier permits each command to have a separate number so that when the controller completes a command, it can notify the disk driver via the identifier number; and (2) by having a way to communicate to the disk driver on completion of individual commands, the controller can queue the commands received and execute them in any order so as to optimize performance. The disk driver must never issue an ID of zero, since unsolicited interrupts use an ID of zero.

TABLE 2

| Op Code (Hex) | Command Op Codes Function |
|---|---|
| 0 | Response Check |
| 1 | Seek (Non queued) |
| 2 | Select Head |
| 3 | Return Controller Information |
| 4 | Checkpoint and Exit intelligent mode |
| 5 | Open Spindle |
| 6 | Close Spindle |
| 7 | Update Interrupt Vector |
| 8 | Update Status Location |
| 9 | Abort Request |
| A | Issue RTZ and Fault Clear |
| B | Read |
| C | Write |
| D | Compare |
| E | Write and Verify |
| F | Format |
| 10 | Re-Format Header/Relocate |
| 11 | Dump |
| 12 | Spin Up device |
| 13 | Spin Down device |
| 14-FF | Unused |

1. The RESPONSE CHECK command is primarily a diagnostic tool to check for controller functionality. The disk controller returns its status to the disk driver without affecting any of the disk devices. The RESPONSE CHECK command includes only the op code, message length and identifier fields.

2. The SEEK (NON QUEUED) command is primarily a diagnostic tool to allow a SEEK command to be issued directly. This command must be issued only to a disk spindle which has not been logically opened via an OPEN SPINDLE command. If this command is issued to an open spindle, an ERROR interrupt will be returned to the disk driver. In addition to the standard data fields, the SEEK (NON QUEUED) command includes a unit number and a cylinder.

3. The SELECT HEAD command allows a disk head to be selected for diagnostic or alignment reasons. This command must be issued only to spindles which have not been logically opened via an OPEN SPINDLE command. If this command is issued to an open spindle, an ERROR interrupt will be returned to the disk driver. In addition to the standard data fields, the SELECT HEAD command includes a unit number and a head.

4. When a RETURN CONTROLLER INFORMATION command is received by the controller, it returns information about the controller and its capabilities and its software and hardware revision levels. All return data is stored in the status block. The RETURN CONTROLLER INFORMATION command includes only the standard data fields.

5. Upon receiving a CHECKPOINT command, the controller begins a process to exit from the intelligent mode of operation by completing all current work in the queues. If a normal command is received after this command, the controller remains in the intelligent mode and continues normal operation. The controller is sent a COMPLETION interrupt with the ID of the CHECKPOINT command when all queues are emptied and all current work is done. The CHECKPOINT command includes only the standard data fields.

6. The OPEN SPINDLE command allows the CPU to logically activate a disk for use. The controller does not allow accesses to a disk spindle until it has been activated except for SEEK, SELECT HEAD and RTZ/FAULT CLEAR. If an improper access is attempted, the controller sets an ERROR interrupt with the appropriate error code in the status block. Upon receipt of the OPEN SPINDLE command, the controller internally sets up for usage of the specified disk. It also issues a RTZ/FAULT CLEAR to the drive if appropriate. When this is completed, the controller sets a COMPLETION interrupt with the identifier stored in the status block to indicate completion of the activation. In addition to the standard data fields, the OPEN SPINDLE command includes a unit number, retries in word 3, byte 1 and record size in byte 4. Retries is the number of retries to allow before internal error correction code is attempted. Record size is the number of words per disk sector.

7. The CLOSE SPINDLE command reverses the effect of an OPEN SPINDLE command. The controller does not accept any more commands for the specified spindle. Current requests in the queue are completed normally. When all outstanding requests have been finished, the controller records the disk as inactive and eliminates the initialization parameters for the disk. It then sends a COMPLETION interrupt with the identifier stored in the status block to indicate completion of the inactivation. In addition to the standard data fields, the CLOSE SPINDLE command includes a unit number.

8. The UPDATE INTERRUPT VECTOR command allows the interrupt vector originally set up in the initialization block to be changed. Upon completion of this command, a COMPLETION interrupt will be set on the new vector with the identifier stored in the status block. In addition to the standard data fields, the UPDATE INTERRUPT VECTOR command includes interrupt vector information in words 3 and 4. Word 3 contains the high order 2 bits of the interrupt vector, and word 4 contains the low order 16 bits of the interrupt vector.

9. The UPDATE STATUS LOCATION command allows the status location parameter given in the original initialize block to be changed. Upon completion of this command, the controller sets a COMPLETION interrupt on the interrupt vector with the identifier stored in the new status block. In addition to the standard fields, the UPDATE STATUS LOCATION command includes a status location in words 3 and 4. Word 3 contains the high order 2 bits of the status location, and word 4 contains the low order 16 bits of the status location.

10. Upon receipt of the ABORT REQUEST command, the controller aborts the request identified by the third word of the command. If the request either cannot be aborted or is not found in the internal queues, the controller sets an ERROR interrupt indicating why the abort could not be accomplished. If the request is found, the ABORT REQUEST command generates a COMPLETION interrupt with its identifier stored in the status block. Another COMPLETION interrupt is also sent for the aborted request. This COMPLETION interrupt contains information in the logical status words indicating that it was aborted. In addition to the standard data fields, the ABORT REQUEST command includes a target identifier in word 3. The target identifier is the identifier of the request that is to be aborted.

11. The RTZ/FAULT CLEAR command causes the controller to issue an RTZ and FAULT CLEAR to the specified device. This command can be issued only to a closed spindle. In addition to the standard data fields, the RTZ/FAULT CLEAR command includes a unit number.

12. Upon receipt of the READ command, the controller takes the information within the command and adds it to the operating queue for the specified device (unit number). The controller includes one queue per device. When it is appropriate to execute a READ command from the queue, the controller automatically selects the device specified by the unit number within the command and issues a SEEK to the appropriate track. Upon completion of the READ operation, the controller sets up DMA transfer to the CPU using the unique identifier to coordinate the data read to the appropriate request.

The number of records field is used to force the data caching algorithm of controller. If the field value is 0 and 1, the controller reads the requested record and transfers it to the CPU. The default record caching algorithm appropriate to the controller and the device is invoked. If the field value is greater than 1, the controller reads the number of records specified in the field, starting with the specified record and going up to the maximum of the number of records contained on the track. If the number specified in the field exceeds the number of records on the track, the full track is read. Only the record specifically requested is transferred to the CPU by the READ command. The remaining records are cached by the controller in order to be available for future READ commands. In addition to the standard data fields, the READ command includes a unit number, a cylinder, a head, a record and a number of records. The number of records is located in word 6, byte 1 and indicates the number of records to read from this track.

13. Upon receipt of the WRITE command, the controller takes the information contained within the command and adds it to the queue of the appropriate device specified by the unit number. When it is appropriate to execute a WRITE command from the queue, the controller sets up a DMA transfer using the unique identifier to relate the actual transfer of data to the appropriate request. The controller takes the data transferred by DMA from CPU memory and places it in an internal buffer memory. The controller generates a BUFFER ACQUIRED interrupt when the data has been transferred to its internal buffer memory successfully. The controller automatically selects the appropriate device specified by the unit number and issues a SEEK to the specified track. The controller generates a COMPLETION interrupt after the data has been written onto the disk. In addition to the standard data fields, the WRITE command includes a unit number, a cylinder, a head and a record.

14. The purpose of the COMPARE command is verification of the WRITE operation at the controller level. Upon receipt of the COMPARE command, the controller reads into its internal buffer space the block of data from CPU memory. The controller issues a BUFFER ACQUIRED interrupt when the data has been successfully transferred to its internal memory. The controller then does a bit-by-bit comparison of the data read from the disk with the data in memory to verify that the data written on the disk is correct. In addition to the standard data fields, the COMPARE command includes a unit number, a cylinder, a head and a record.

15. The WRITE AND VERIFY command allows the combined usage of the WRITE command and the COMPARE command without requiring two command blocks and without sending data over the backplane twice. The controller does a normal WRITE without sending the COMPLETION interrupt. It then compares the data written on the disk with the data still retained in its internal buffer memory The comparison is made by a hardware comparator that compares the serial bit stream from the disk with the memory. The COMPLETION interrupt is then issued if the data was written correctly. An ERROR interrupt is issued if the data did not match. In addition to the standard data fields, the WRITE AND FORMAT command includes a unit number, a cylinder, a head and a record.

16. The FORMAT command causes the controller to format the track (not block format) or tracks (block format) of the specified device with the number of records called out within the command. The record size information from the OPEN SPINDLE command is used as the data field size for the record format. In addition to the standard data fields, the FORMAT command includes a unit number, number of records, initial cylinder address, ending cylinder address, initial head address, ending head address and options. The number of records field is located in word 3, byte 1 and indicates the number of records to be formatted per track. The initial cylinder address is located in word 4 and indicates the cylinder address of the first track to be formatted. The ending cylinder address is located in word 5 and indicates the ending cylinder address of a block of tracks to be formatted (undefined for nonblock mode). The initial head address is located in word 6, byte 1 and indicates the head address of the first track to be formatted. The ending head address is located in word 6, byte 2 and indicates the ending head address of a block of tracks to be formatted (undefined for nonblock mode). The options are located in word 7 and indicate various formatting options.

17. The REFORMAT HEADER/RELOCATE command allows the controller to reformat a specific record in order to work around a bad spot on the disk by relocating the specific record. The command rewrites the record header with information indicating that the data has been relocated. In addition to the standard data fields, the REFORMAT HEADER/RELOCATE command includes unit number, source cylinder, source head, source record, destination cylinder, destination head, destination record and displacement fields. The source cylinder is located in word 4 and indicates the track location on the disk. The source head and source record fields are located in word 5, bytes 1 and 2, respectively, and indicate the physical head number on the disk and the physical disk record number to be reformatted. The destination cylinder is located in word 6 and indicates the track location on the disk for the target record. The destination head and record fields are located in word 7, bytes 1 and 2, respectively, and indicate the head number for the target record and the record number of the target record. The displacement field is located in word 8, byte 2 and indicates the number of words of displacement from address mark/sector pulse.

18. The DUMP command is a diagnostic tool which allows access to the memory of the disk controller. Any section of the memory can be read. This is a read only operation. A starting address of 0 starts transfers from the beginning of RAM in the disk controller. The CPU has full control over how many words will be transferred by setting the range and the chain length of the DMA channel. The controller transfers data until end-of-range, end-of-chain is set. The maximum number of words that can be transferred with one call is 1024 words. In addition to the standard data fields, the DUMP command includes a 32 bit starting address in words 3 and 4. The starting address is a 32-bit address of the memory location at which the transfer begins.

19. The SPIN UP command causes the remote turn on of a spindle. The command can only be issued to a nonopen spindle. In addition to the standard data fields, the SPIN UP command includes a spindle number in word 3, byte 2.

20. The SPIN DOWN command causes the remote turnoff of a spindle. This command can only be issued to an open spindle. In addition to the standard data fields, the SPIN DOWN command includes a spindle number in word 3, byte 2.

Status Block

The status block is a means for the disk controller to notify or communicate to the disk driver the results of a previously-issued command. The controller notifies the CPU of events by vectored interrupts. The controller uses the vector passed to it in the initialize block.

Figure 4:
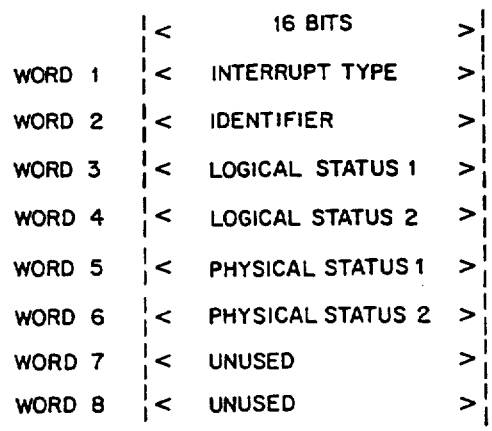
FIG. 4 illustrates the data structure of a status block in the system of the present invention.

Before interrupting the CPU, the controller places all pertinent information in the status block. Every status block sent to the disk driver by the controller, except as follows, contains the unique identifier number that was part of the original command sent to the controller. Exceptions to this rule are UNSOLICITED interrupts and ERROR interrupts for events in which the ID was never known (bad OTA, illegal command, etc.). These interrupts use an ID of 0. The seven possible interrupts sent in a status block to the disk driver are: (1) COMMAND BLOCK READ; (2) TRANSFER REQUEST; (3) BUFFER ACQUIRED; (4) COMPLETION; (5) ERROR; (6) UNSOLICITED; (7) RE- TURN CONTROLLER INFORMATION. The general format of the status block is shown in FIG. 4. Logical status word 1 is defined in Table 3; physical status word 1 is defined in Table 4; and physical status word 2 is defined in Table 5. Logical status word 2 is provided for future expansion.

TABLE 3

| Logical Status Word 1 | |
| --- | --- |
| Bit 1 | Set to one if and only if a non zero bit exists in bits 3–16 of LSW 1, in bits 1–16 of PSW1 or in bits 2–16 of PSW 2. |
| Bit 2 | Set to one if and only if a non zero bit exists in bits 1–16 of PSW1 or in bits 2–16 of PSW 2. |
| Bit 3 | Startup failure. |
| Bits 4–6 | Reserved for future use. |
| Bits 7–8 | 00 = Command Completed Successfully. 01 = Command Completed Successfully With Retries. 10 = Command Completed Successfully With Correction. 11 = Command Completion was not Successful. |
| Bit 9 | Illegal parameter. LSW 2 contains word number. |
| Bit 10 | A Protocol error was detected. Handshaking, etc. did not occur at the appropriate time or in an incorrect order. Also used to indicate a DMA transfer error. |
| Bit 11 | An OTA with an undefined function code was received. Except for the error interrupt, the OTA was ignored. |
| Bit 12 | Spindle is already open. No change to spindle attributes have been made. |
| Bit 13 | Spindle is closed or has not been opened yet. This can occur in two ways. Either a spindle type command was issued before the spindle was opened, or a close command was issued and another command to that spindle was then received. |
| Bit 14 | Used in response to an Abort request. Indicates that a queued request cannot be aborted, due to being in process or not being found in the internal queues. |
| Bit 15 | Used in response to an aborted request. Indicates that an Abort request or Abort OTA was used to terminate the command. |
| Bit 16 | Maximum Number of Supported Spindles Exceeded. |

TABLE 4

| Physical Status Word 1 | |
| --- | --- |
| Bit 1 | Hardware Timeout |
| Bit 2 | Compare Error detected |
| Bit 3 | Data Underflow or Overflow detected |
| Bits 4–16 | Unused |

TABLE 5

| Physical Status Word 2 | |
| --- | --- |
| Bit 1 | Always set to 1 |
| Bit 2 | DMA Overrun |
| Bit 3 | Disk Write Protected |
| Bit 4 | Read Check |
| Bit 5 | Data PARITY Error |
| Bit 6 | Header Check |
| Bits 7–10 | Unused |
| Bit 11 | Disk BUSY (Dual port. Other port has disk) |
| Bit 12 | Unused |
| Bit 13 | Disk Seeking |
| Bit 14 | Seek Error |
| Bit 15 | Disk Selection Invalid |

TABLE 5-continued

| Physical Status Word 2 | |
| --- | --- |
| Bit 16 | Disk Not Ready |

1. The COMMAND BLOCK READ interrupt is sent each time a command is issued to the controller and the controller has successfully read the command block. This interrupt indicates to the CPU when it is safe to modify the contents of the command block for a new command. The ID of the command block is stored for this interrupt.

2. The TRANSFER REQUEST interrupt is used to set up the data transfer between the CPU and the disk controller when the controller is in the process of executing a command that requires DMA transfer and is ready to transfer data. The commands requiring DMA transfer include READ, WRITE, VERIFY, WRITE AND VERIFY and DUMP. The TRANSFER REQUEST interrupt notifies the disk driver which request the controller is working on by sending the unique identifier. The driver sets up the I/O window and the DMA channel and chain in the DMA block. The driver then issues an OTA 00 (acknowledge) to the controller. The controller fetches the contents of the DMA block and begins transferring data.

3. The BUFFER ACQUIRED interrupt is sent only for the WRITE, COMPARE and WRITE AND VERIFY commands. This interrupt indicates that the data to be written or compared has been successfully transferred to the controller. The ID is stored for this interrupt with the interrupt type. The BUFFER ACQUIRED interrupt permits the CPU to free up the I/O window and the DMA channel for the transfer without having to wait for the COMPLETION interrupt. However, this interrupt is not required to occur. A COMPLETION interrupt accomplishes all the cleanup required. Controllers without buffer space do not issue this interrupt type.

4. The COMPLETION interrupt indicates the successful completion of any previously sent command. The status word includes the identifier. In addition, logical status word 1 is required to indicate if any status is included and which parts of it are valid. If no status is being returned, only the bits of logical status word 1 indicating such are required to be correct.

5. The ERROR interrupt is sent to indicate detection of an error during the process of executing or attempting to execute a previously-issued command. The disk controller also sends ERROR interrupt if the controller receives any command or OTA which is invalid. Upon receipt of an invalid command or OTA, the controller sends an ERROR interrupt with the status block indicating an illegal command indicator. An OTA with an illegal function code or a command with a bad op code are reasons for setting this type of interrupt. The ERROR interrupt is also sent if the controller receives an OTA 00 (acknowledge) at an inappropriate or unexpected time.

6. The UNSOLICITED interrupt permits the disk controller to notify the CPU of certain events. The UNSOLICITED interrupt is not associated with any command, but only with internal controller events or disk events. The data is stored in the status block as in the case of any other interrupt. The types of UNSOLICITED interrupts include (a) DISK SPUN UP, (b) DISK SPUN DOWN, (c) SELF CHECKPOINT RE- QUIRED, (d) SELF CHECKPOINT COMPLETE, (e) CONTROLLER REQUIRES WARM START, (f) CONTROLLER DETECTED ERROR, (g) BAD SPOT TABLE IS FULL.

a. The DISK SPUN UP interrupt indicates that a disk has just come ready or online after having been unavailable.
b. The DISK SPUN DOWN interrupt indicates that a disk has been spun down, powered down or gone offline. If the spindle is active, the disk driver must stop sending commands to that particular disk.
c. The SELF CHECKPOINT REQUIRED interrupt is generated when the controller has found an internal error that might be recoverable. This interrupt tells the disk driver to stop sending commands until the controller can determine what is wrong and decide whether or not to continue. No new commands are accepted during this time. Unless the error is fatal and causes the controller to hang up, the SELF CHECKPOINT REQUIRED interrupt is followed by another interrupt indicating what the controller will do.
d. The SELF CHECKPOINT COMPLETE interrupt is used to indicate to the disk driver that the previously begun self checkpoint has resulted in a repair or recovery of an earlier-discovered problem. The controller is now ready to accept and execute commands.
e. The CONTROLLER REQUIRES WARM START interrupt is used to indicate that the controller needs a warm start. It is no longer capable of running and needs to be shut down and brought up again. This interrupt can be the result of a self checkpoint, or it can occur whenever an unrecoverable error is detected by the controller.
f. The CONTROLLER ERROR interrupt is used when the controller finds an internal inconsistency related to a command. The controller must assume it is at fault and tell the disk driver that it can no longer work on this command. The driver has the option of reissuing the command, if desired.

7. The RETURN CONTROLLER INFORMATION interrupt is used in response to a RETURN CONTROLLER INFORMATION command. Information about the abilities of the controller and the software/hardware revision level is placed in the status block.

DMA Block

Figure 5:
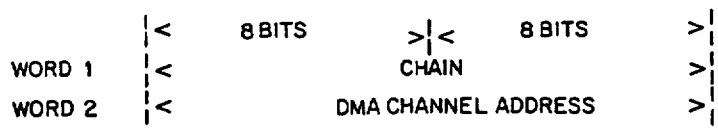
FIG. 5 illustrates he data structure of a DMA block in the system of the present invention.

The DMA block contains the necessary information to allow the controller to send or receive data over a DMA channel. An OTA 00 is always sent to the controller in response to a TRANSFER REQUEST interrupt. After the OTA is received, the controller fetches the contents of the DMA block to be used in the DMA transfer. This allows the operating system to vary the DMA channel and chain on a per request basis, if desired. The format of the DMA block is shown in FIG. 5.

Initialize and Interrupt Command

The INITIALIZE AND INTERRUPT command is defined as an extension under the degraded or dumb mode of operation. This command is used to direct the controller to leave the dumb mode and enter the intelligent mode. The INITIALIZE AND INTERRUPT command contains the necessary information to allow the controller to communicate with the CPU using the intelligent mode protocol. It is used after the intelligent mode program has been downloaded to the disk controller. The specific format of the INITIALIZE AND INTERRUPT command is shown in FIG. 5A.

Upon receiving the INITIALIZE AND INTERRUPT command, the controller continues to operate in the dumb mode after receipt of the HALT channel command. The controller begins to execute the intelligent mode initialization software. If the initialization software is successfully completed, the controller issues an INTELLIGENT MODE STARTUP interrupt to the CPU. The CPU responds with an OTA 00 continue acknowledge.

Downline Load Command

The DOWNLINE LOAD command is defined as an extension under the degraded or dumb mode of operation and is used to load the intelligent mode program into the controller. The specific format for the DOWNLINE LOAD command is shown in FIG. 5B. The controller program is stored on disk as a standard sequential file. In order to load the controller, the CPU reads the file and sends it back to the controller one sector at a time. Following the interrupt at the end of each block transfer, the CPU checks the status word to insure that the block was transferred to the controller without error. If an error occurred, the block is retransferred to the controller (or the entire load sequence can be retried). The CPU continues with this sequence until it reaches an end of file. The CPU then sends the controller an INITIALIZE AND INTERRUPT command.

Example of Operation

A sequence of operations between the disk driver and the disk controller for a READ command is illustrated in the following example: controller.

(1) The CPU sends an OTA 10, 11, 12 or 13 to the controller.
(2) The controller reads the command block via DMT.
(3) After the controller has verified the validity of the command, it sends a COMMAND READ status block to the CPU via DMT.
(4) The controller interrupts the CPU.
(5) The CPU sends an OTA 00 (continue notify) to the controller to acknowledge that it has processed the status block.
(6) When the controller has read the required sector from the disk and is ready to transfer it to the CPU, the controller sends a TRANSFER REQUEST status block to the CPU via DMT.
(7) The controller interrupts the CPU.
(8) The CPU sets up a DMA block for the controller.
(9) The CPU sends an OTA 00 acknowledge) to the controller.
(10) The controller reads the DMA block via DMT.
(11) The controller transfers the disk data to the CPU via DMA.
(12) The controller sends a COMPLETION status block to the CPU via DMT.
(13) The controller interrupts the CPU.
(14) The CPU sends an OTA 00 (acknowledge) to the controller.

DISK DRIVER

The disk driver comprises three major parts. The call routine 46 (FIG. 2) directs the disk request from a user to the proper disk request queue and builds a disk request queue block. The queue block is linked onto a string of queue blocks. The call routine generates a disk request ID number which includes a unit number and a unique increasing monotonic identification number. The ID is placed into the queue block and serves to identify a user request throughout the sequence of operations involved in executing the request. Common disk driver routines perform functions such as get an I/O window, allocate DMA channels, convert logical record addresses to physical disk addresses, programmed input/output, error correction, etc.

Figure 6:
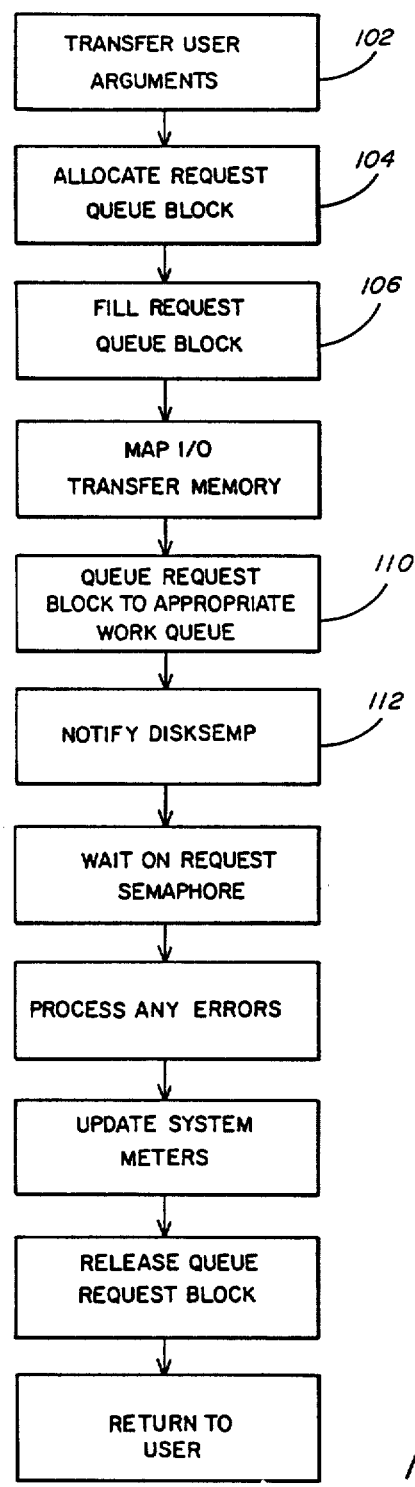
FIG. 6 is a flow diagram illustrating the general operation of the call routine in accordance with the present invention.

A flow diagram of the call routine is shown in FIG. 6. Initially, the user arguments are transferred to a temporary storage location in step 102, and a disk request queue block is allocated in step 104. Next, the queue block is filled with the appropriate information in step 106. The queue block includes the following information: (1) a pointer to the next queue block in the appropriate list; (2) the queue block ID including target unit number and a sequence number; (3) a semaphore; (4) a device type; (5) a unit number; (6) a cylinder number; (7) head and record numbers; (8) a virtual buffer address or format command; (9) a physical page address; (10) words per channel; (11) number of channels and keys; (12) abort ID; (13) total time; (14) disk record information; (15) error message; and (16) space for storage of the status block information received from the controller. After the queue block is filled with the appropriate information, it is placed on the appropriate work queue in step 110. As indicated previously, a work queue is provided for each disk drive in the system. In step 112, the disk semaphore in the driver routine is notified that a user request has been received and the associated queue block has been placed on the work queue.

Figure 7:
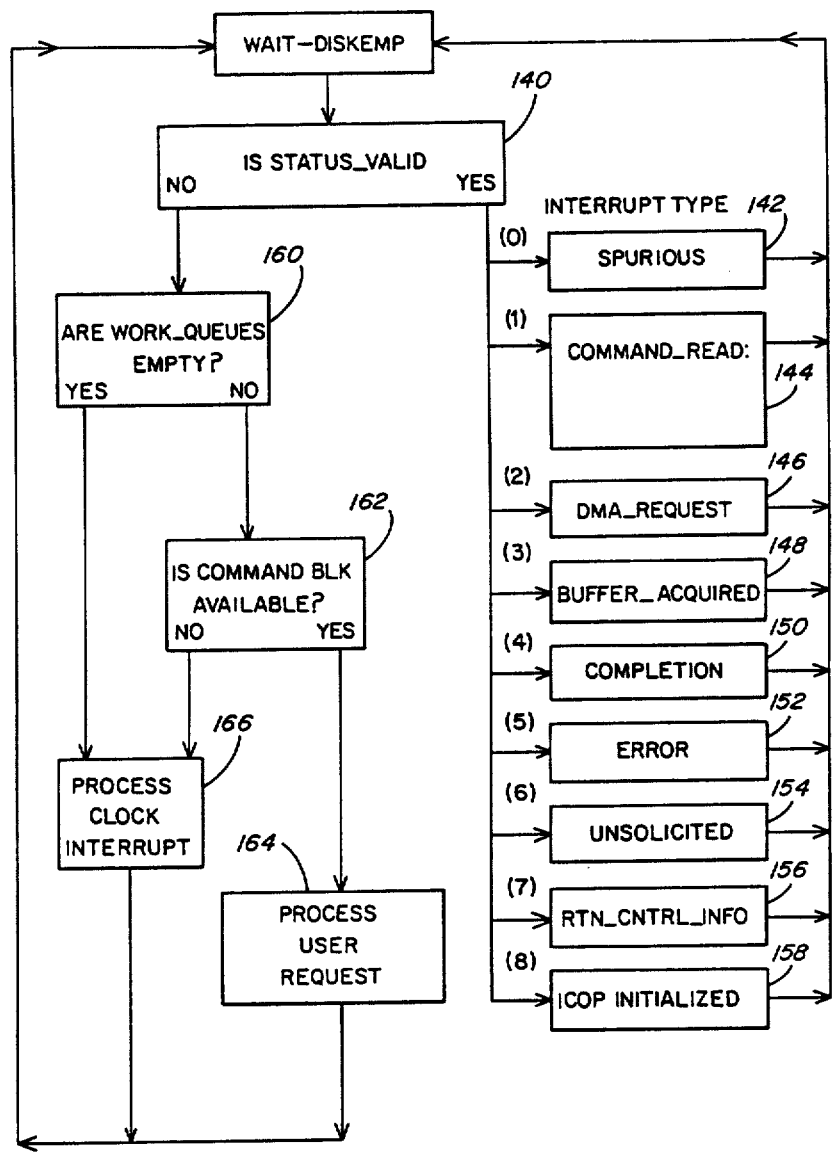
FIG. 7 is a flow diagram illustrating the general operation of the disk driver routine in accordance with the present invention.

The driver routine 50 (FIG. 2) the disk driver is a set of state machines. The primary state machine is driven by disk controller interrupts on one side and by queue blocks posted to the work queues on the other. The basic driver routine states are (1) wait for work to do, (2) process a controller interrupt, (3) process a user request, (4) process a clock request. The driver routine can be invoked in four ways: (1) each queue block posted to the work queues by the call side notifies the driver routine; (2) each interrupt by the disk controller notifies the driver routine through a notify instruction located in disk phantom interrupt code; (3) each tick of the clock notifies the driver routine; (4) a spurious notify to the driver routine semaphore. A flow diagram of the driver routine is shown in FIG. 7.

The driver routine is an infinite loop that is started when the controller program is successfully downloaded by the operating system. The normal condition of the main process loop is to be waiting for work to be put on one of the work queues. The diver routine is in a wait or sleep state when there is no work to be done. The basic logic flow is based on the fact that the driver routine would not be awake if there was not work to do.

Figure 10:
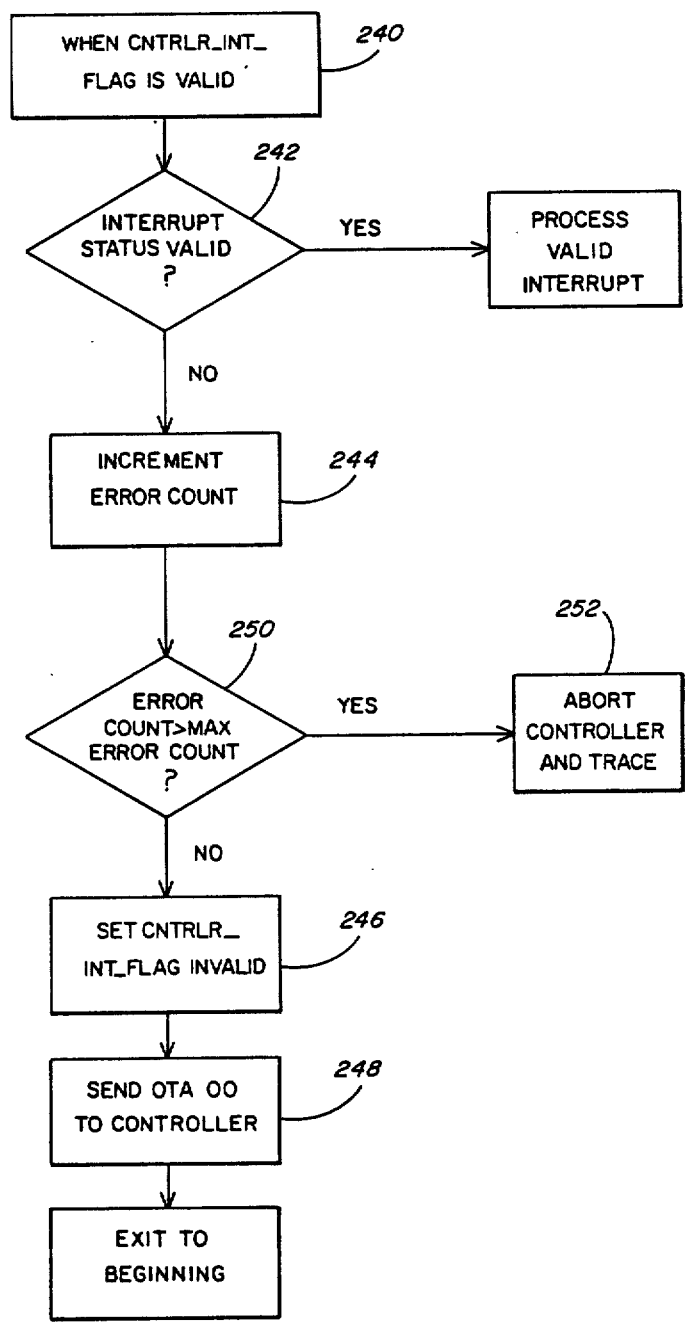
FIG. 10 is a flow diagram illustrating the routine for processing a spurious interrupt.
Figure 11A:
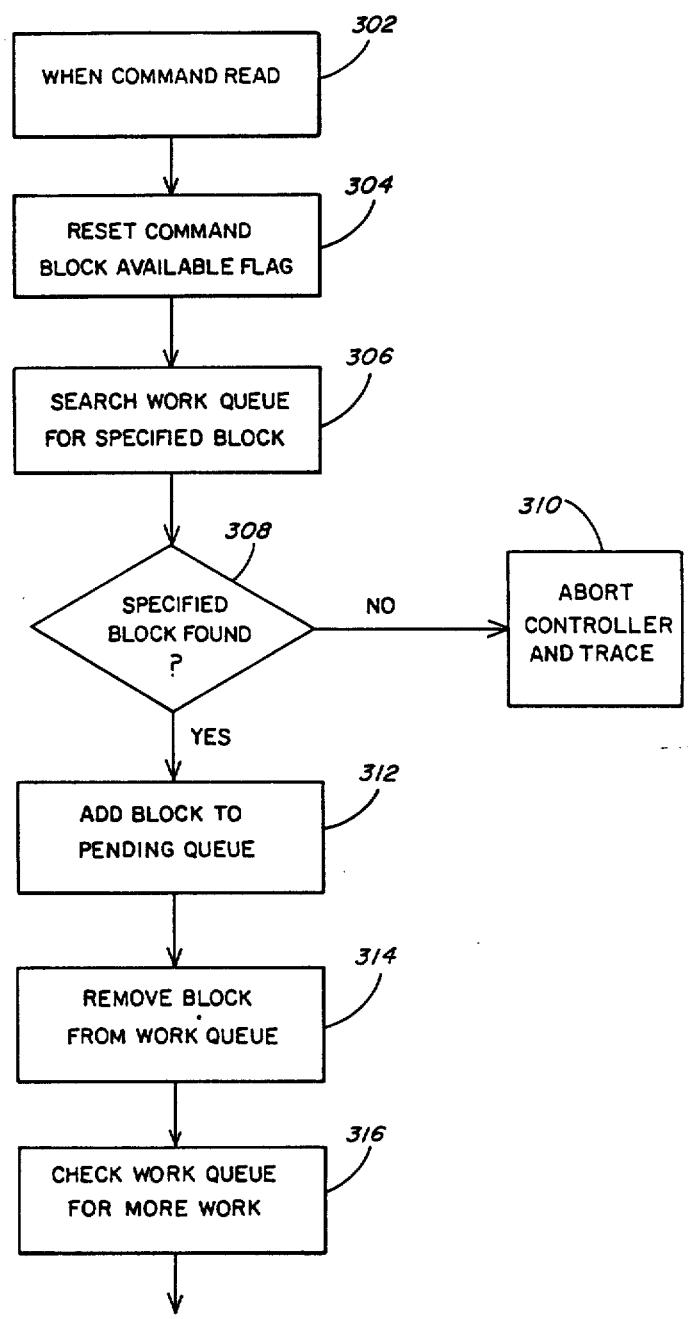
FIGS. 11A and 11B are flow diagrams illustrating the routine for processing a COMMAND READ interrupt.
Figure 11B:
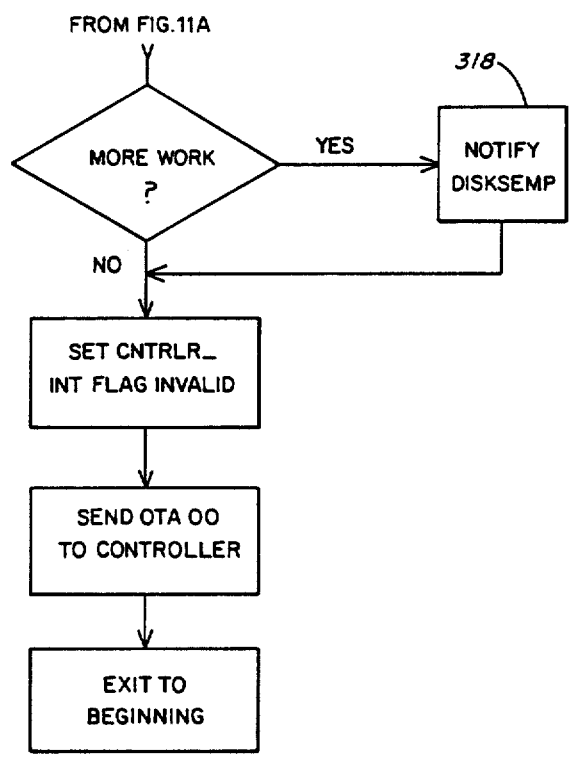
Figure 12:
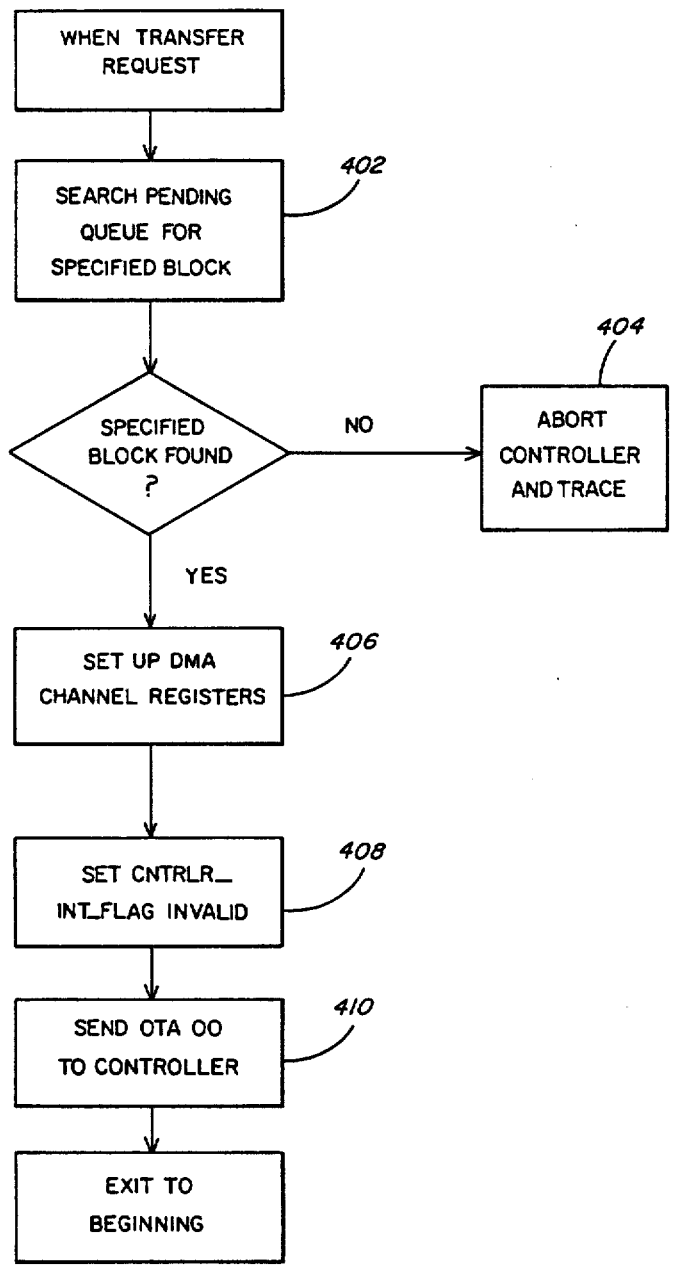
FIG. 12 is a flow diagram illustrating the routine for processing a TRANSFER REQUEST interrupt.
Figure 13:
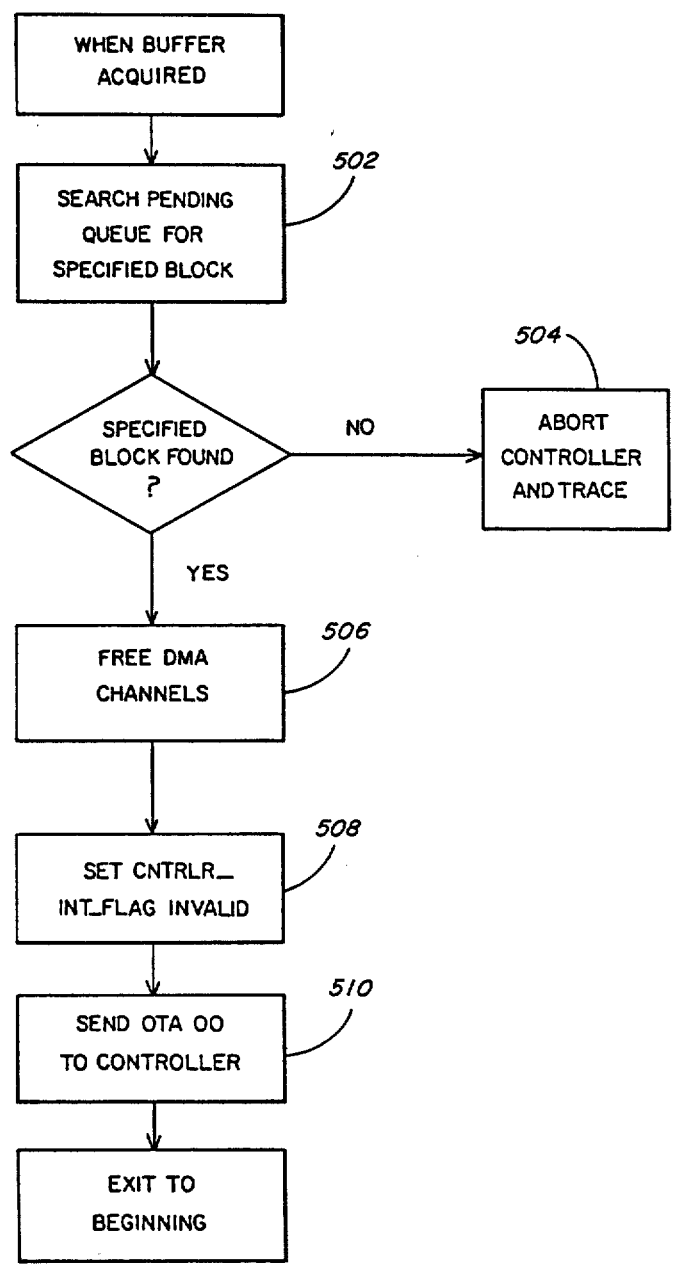
FIG. 13 is a flow diagram illustrating the routine for processing a BUFFER ACQUIRED interrupt.
Figure 14A:
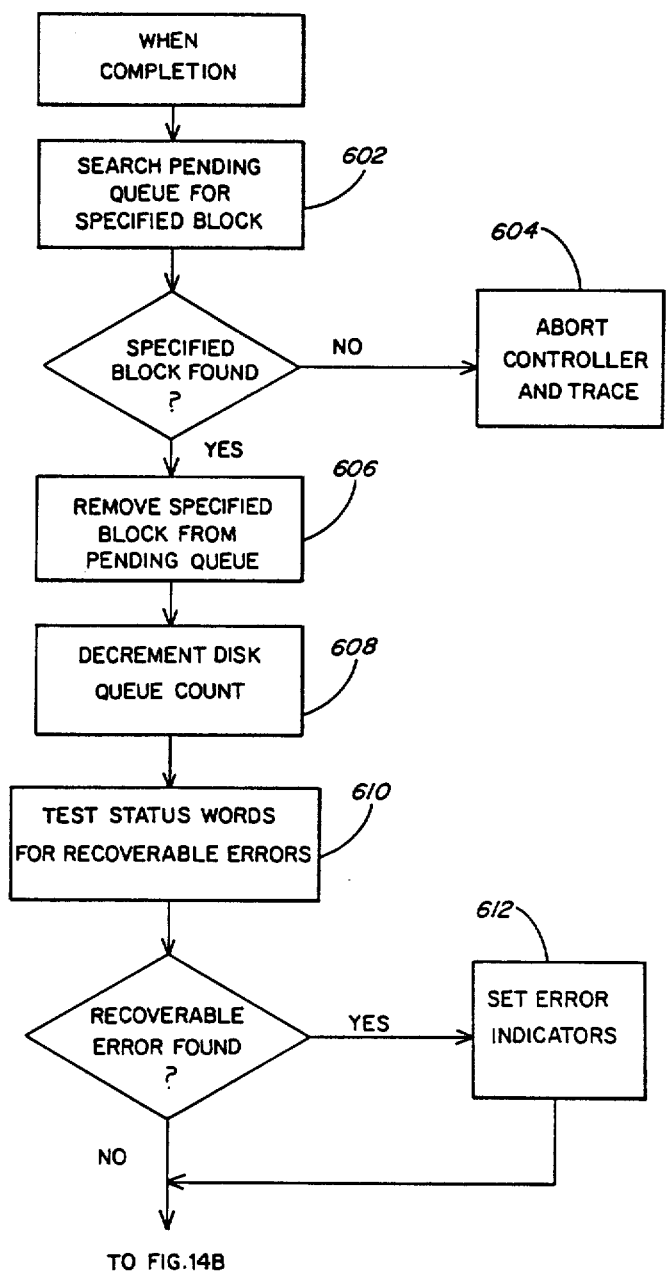
FIGS. 14A and 14B are a flow diagrams illustrating the routine for processing a COMPLETION interrupt.
Figure 14B:
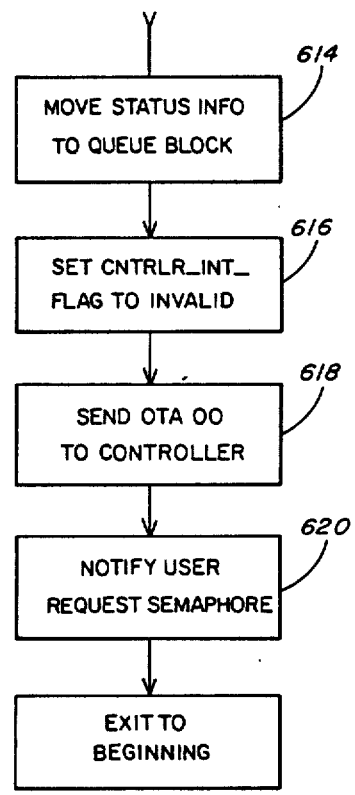
Figure 15A:
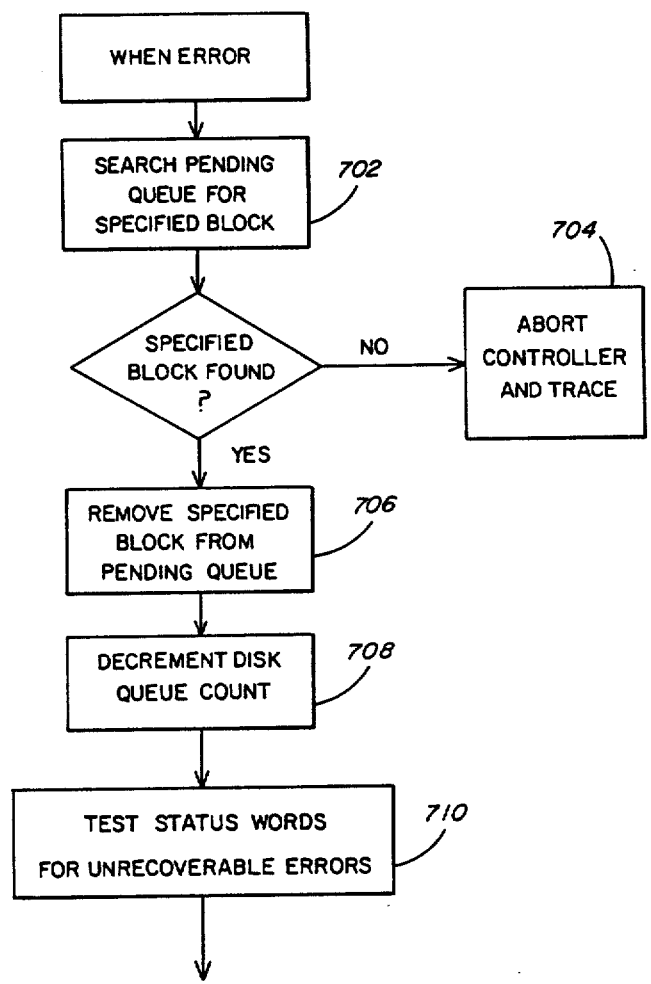
FIGS. 15A and 15B are flow diagrams illustrating the routine for processing an ERROR interrupt.
Figure 15B:
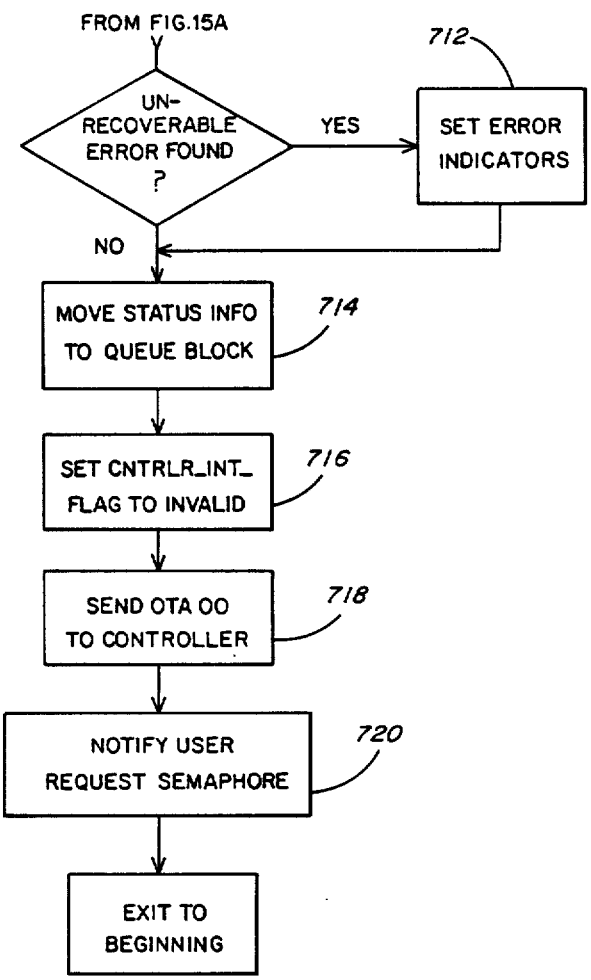
Figure 16:
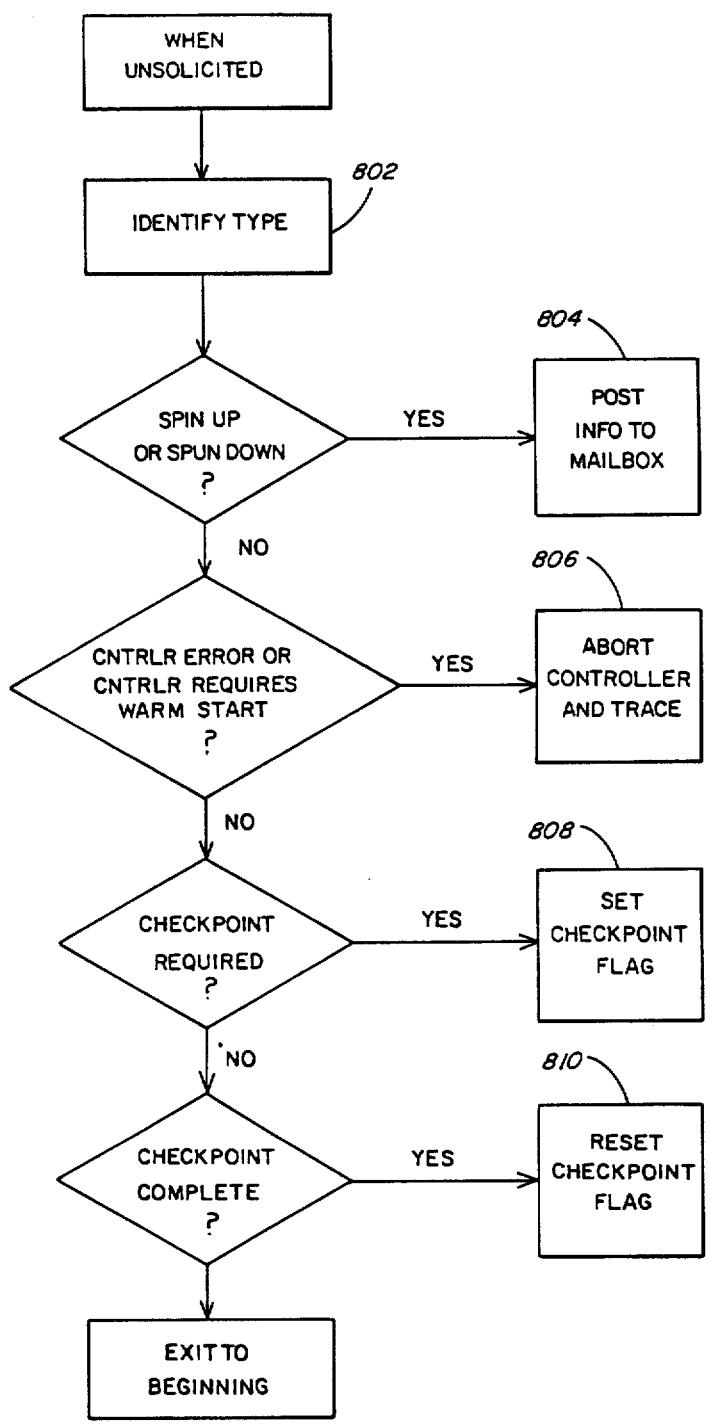
FIG. 16 is a flow diagram illustrating the routine for processing an UNSOLICITED interrupt.
Figure 17:
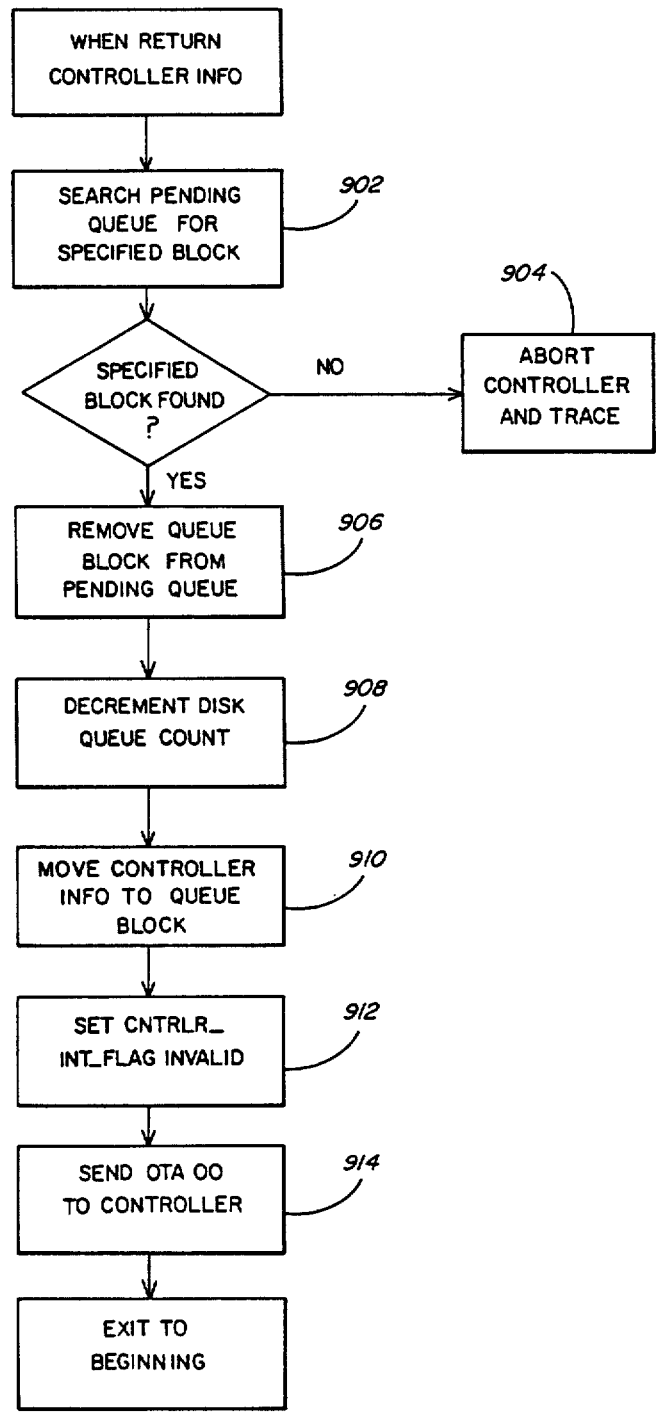
FIG. 17 is a flow diagram illustrating the routine for processing a RETURN CONTROLLER INFORMATION interrupt.

When the controller interrupts the CPU in connection with a status block, a phantom interrupt routine is executed. As shown in FIG. 7, if the controller interrupt flag is found in step 140 by the checking routine to be true, then a controller interrupt was received. The controller interrupt flag is set valid by the phantom interrupt and is made invalid when the interrupt service routine is completed. The appropriate routine for processing the interrupt is invoked. A flow diagram of a spurious interrupt service routine 142 is shown in FIG. 10. A flow diagram of a COMMAND READ interrupt service routine 144 is shown in FIGS. 11A and 11B. A flow diagram of a TRANSFER REQUEST interrupt service routine 146 is shown in FIG. 12. A flow diagram of a BUFFER ACQUIRED interrupt service routine 148 is shown in FIG. 13. A flow diagram of a COMPLETION interrupt service routine 150 is shown in FIGS. 14A and 14B. A flow diagram of an ERROR interrupt service routine 152 is shown in FIGS. 15A and 15B. A flow diagram of an UNSOLICITED interrupt service routine 154 is shown in FIG. 16. A flow diagram of a RETURN CONTROLLER INFORMATION interrupt service routine 156 is shown in FIG. 17. These interrupt service routines are described in detail hereinafter.

Figure 18:
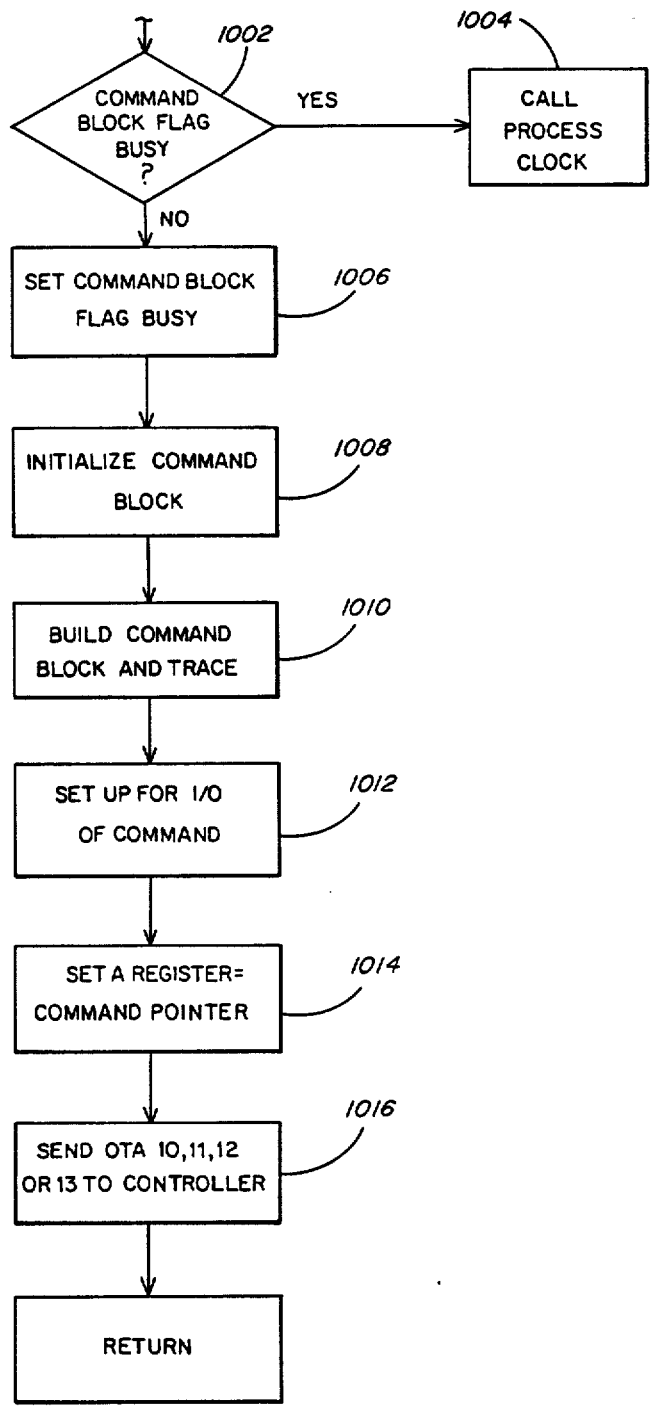
FIG. 18 is a flow diagram illustrating the routine for processing a user request.

If the controller interrupt flag is false, then the call routine must have posted work to one of the work queues or the clock caused an interrupt. The driver routine scans the work queues in step 160. The scanning of the work queues is performed in an upward spiral order to insure fairness in executing user requests. If a disk request queue block is found, the command block available flag is tested in step 162. This flag is set by work to do and is reset by the COMMAND READ interrupt service routine. If the command block available flag is true, a process user request routine 164 is called. A flow diagram of the process user request routine 164 is shown in FIG. 18. The process user request routine 164 constructs a command block and sends it to the disk controller. If the command block available flag is false, it is assumed that the clock process notified the disk process, and a process clock interrupt routine 166 is called. In this case, the time associated with each of the queues is tested. If work has been on one of the queues for more than a predetermined time, it is assumed that a problem has arisen and appropriate corrective action is taken.

There are two queues associated with each disk drive, a work queue and a pending queue. As noted above, the system may include up to eight disk drives per controller and eight disk controllers, for a total of 64 work queues and 64 pending queues.

Figure 8:
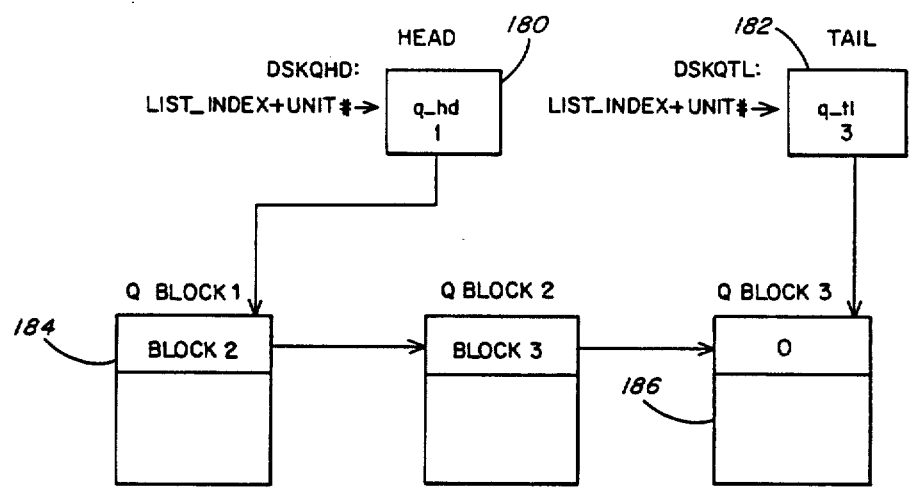
FIG. 8 is a block diagram illustrating the structure of the work and pending queues in the disk driver.

All queues have the same basic structure, as shown in FIG. 8. They consist of a single-threaded, forward linked list. Each queue is identified by a queue head pointer 180 and a queue tail pointer 182. The queues are accessed through a queue head list or a queue tail list that contains the head and tail pointers, respectively, of the individual queues. The queue head pointer 180 in the queue head list points to a first block 184 in the queue, and the queue tail pointer 182 in the queue tail list points to a last block 186 in the list. Each queue block contains a forward link which points to the next block in the queue. Each queue block contains the information required to execute a disk request, as described hereinabove. The following rules apply to each queue. If the queue tail pointer points to the queue head and the head pointer is null, then the queue is empty. If the forward link of a disk request block is null, then that block is the last block on the queue.

The work queue is where the call routine posts user requests for disk transfers. The pending queue is where the driver routine deposits user requests that have been serviced by the driver routine, but have not been completed by the disk controller. The normal sequence of operations is as follows. The call routine posts the disk request block to the tail of the work queue. The driver routine removes a block from the head of the work queue and posts it to the tail of the pending queue. The queue block remains on the pending queue until the controller has completed execution of the command.

The above-described queue structure is advantageous in recovering from a controller error which requires warm restart by downloading the controller program. After restart, any disk requests that were sent to the controller but were not completed prior to restart must be repeated. Such requests are identified by the blocks on each pending queue. Upon restart, each pending queue is appended to the head of the respective work queue, and the pending queues are initialized to zero. By this manipulation of the queues, the earliest-received work requests on the pending list are shifted to the head of the work list. Thus, the first work request to be processed after warm restart is the earliest work request received. In this way, first in/first-out operation is maintained even though the disk controller is restarted and a slight delay may occur.

In order to manipulate the work and pending queues, the following routines are utilized by the disk driver. (1) An ADD WORK routine posts work to the proper queue and notifies the driver routine. (2) A BUILD QUEUE TAILS routine builds the queue tail pointers for a given controller's work queues. (3) A CHECK WORK QUEUES routine looks for work to do. (4) A SEARCH QUEUE ID routine searches a selected queue looking for a specified disk process ID. (5) An INSERT QUEUE BLOCK routine inserts a specified queue block into a selected queue. The block is included at the tail of the queue. (6) A REMOVE QUEUE BLOCK routine removes the specified queue block from the specified queue. (7) An APPEND HEAD WORK QUEUES routine appends all active pending queues to the heads of their respective work queues and initializes the pending queue heads and tails to zero. (8) An APPEND TAIL WORK QUEUES routine appends all of the active pending queues to the tails of their respective work queues and initializes the pending queue heads and tails to zero.

The disk control technique of the present invention off-loads much of the overhead associated with disk requests from the CPU to the disk memory unit. Disk requests are performed in an asynchronous manner, and CPU time is minimized. All information regarding a user request is contained in the command sent to the disk memory unit. No further action is required by the CPU until the disk memory unit initiates an interrupt for a data transfer or an interrupt to indicate completion of the user request. The disk memory unit can queue a number of user requests and execute them in an efficient manner. The disk controller can decide to execute user requests in an order appropriate to the disk drive rather than the order in which the requests were received. The disk controller typically places user requests on a queue for subsequent execution. However, in spite of the fact that the disk memory unit has intelligence and operates in an independent manner, the work queues and the pending queues in the disk driver program permit the CPU to closely monitor disk operations. The CPU at all times has a complete record in the work queue of user requests that have been received but have not been forwarded to the disk memory unit. In addition, the pending queue contains a complete record of all user requests that have been dispatched to the disk memory unit but have not yet been completed. As a result, the CPU can identify user requests that have not been completed within a given time and can recover from disk memory unit errors, as described hereinafter.

The disk driver program incorporates the concept of a watchdog timer to control and monitor disk operations without affecting throughput. Each command is assigned a maximum allowable time for completion. The time that the command was dispatched to the disk memory unit is stored in the corresponding queue block. The system clock regularly interrupts the driver routine. When a clock interrupt occurs, the entries in the pending queue are checked to determine if the maximum allowable time has been exceeded. When the maximum allowable time has been exceeded for any pending operation, it is assumed that the disk controller has a problem, and the reinitialization routine is invoked. Thus, if the disk controller should halt or otherwise fail to complete one or more commands, the watchdog timer detects the situation and causes the disk controller to be reinitialized.

The reinitialization procedure can be invoked for several reasons. As described above, the watchdog timer can determine that a user request has not been completed in the maximum allowable time. Also, the disk controller can detect errors associated with the transfer or execution of a command. Furthermore, the disk controller can detect errors in its own operation that are not associated with any particular command. For either type of error, the disk controller program causes an error interrupt to be sent to the CPU. Information regarding the nature of the error is contained in the status word. The error interrupt causes reinitialization of the disk controller.

When the reinitialization routine is invoked, the system switches to a degraded, or dumb, mode of operation and may be able to continue disk operations in this manner, depending on the nature of the problem that occurred. In the degraded mode, the CPU downline loads the disk controller program, and then sends an INITIALIZE AND INTERRUPT command to the disk controller, causing it to switch back to the intelligent mode of operation. In addition, each pending queue is appended to the head of the associated work queue as described hereinabove, and operation is resumed in the intelligent mode. The reinitialization procedure is performed automatically when the specified error conditions are detected without action or intervention by the user. The user may receive a message that the reinitialization occurred and experience some delay in completion of user requests, but is otherwise unaware that the disk memory unit has been reinitialized.

The disk driver preferably includes a trace routine that can be enabled during normal operation to track traffic and errors and to accumulate information useful in debugging and performance testing. The trace routine, which operates in real time, places specified information regarding each disk driver operation in a trace table. The trace routine can selectively be enabled or disabled. In one example, the trace table includes 4,096 entries, each consisting of eight words. All calls to the trace routine result in an entry in the trace table. The trace table is circular in nature and wraps around when the end is reached. The size of the trace table determines the amount of disk history that can be accumulated. At a rate of 20 disk transfers per second on four disk drives, the 4,096 entry trace table can track 51 seconds of disk traffic before it wraps around.

Each entry in the trace table incudes four pieces of information: (1) a trace type, (2) a trace queue pointer, (3) a trace ID, and (4) a trace message. The trace type is an indicator to a trace program that tells it how to trace the error. The trace types are:

0 = process interrupt routine
1 = process unsolicited interrupt routine
3 = process user request routine
4 = process clock routine The trace queue pointer is the pointer to the traced queue block. Disk request blocks are taken from the top of the free queue block list and are put back on the bottom of the list. This allows time to collect a history of disk request blocks before they are reused and lost as sources of information.

The trace ID is the queue block ID that is assigned by the call routine of the disk driver. It serves as an audit trail for the request independent of the queue block. It also serves as a check to determine whether the trace queue pointer is really pointing to the traced queue block. If the queue block ID is not equal to the trace ID, then the queue block has been reused and the information it contains is no longer relevant.

The trace message is an offset into a message array that contains an English language message about the traced event. There is a different array of messages for each type of event traced.

When the trace routine is first enabled, diagnostic checks of system performance are made. The trace table entries then are accumulated as part of each interrupt service routine, during the process user request routine and during the process clock routine. The trace routine operates only if the trace switch is enabled or on. Each time the disk controller initiates an interrupt, a trace table entry is made. The trace message in the entry indicates the interrupt type. Each time an interrupt service routine does not find a specified queue block in the pending queue, a trace table entry is made. The trace message in the entry indicates the type of interrupt and the fact that the specified ID was not found in the pending queue. In the case of an unsolicited interrupt by the disk controller, the trace queue pointer and trace ID are both zero since the unsolicited interrupt is not associated with a user request. The trace message in the table entry indicates the type of unsolicited interrupt. When a command block is built, a trace table entry is made. The trace message in the entry indicates the type of command. When the process clock routine is being executed, a trace table entry is made if a controller time out is detected. The trace message in the entry indicates that the controller has timed out. When a trace function is specified in the disk driver routines shown in FIGS. 9A-18 and described hereinafter, a trace table entry is made, but only if the trace switch is enabled.

The trace table can be used at a later time for debugging and troubleshooting. The trace routine can be programmed to operate until a specified breakpoint in the program and then retain the contents of the trace table. The trace routine has been found to affect the system performance by less than one percent when it is running.

Figure 9:
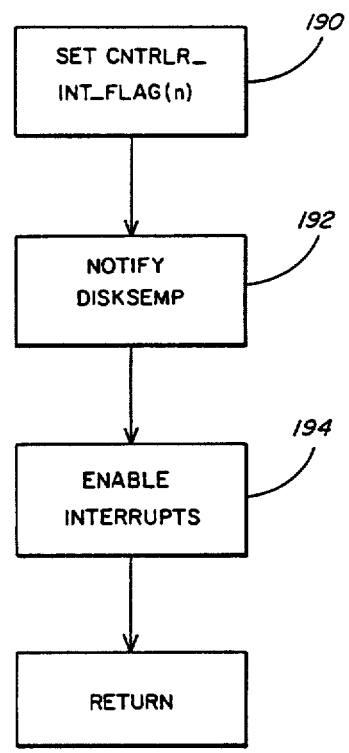
FIG. 9 is a flow diagram illustrating the routine for processing a phantom interrupt.

A flow diagram of the phantom interrupt routine is shown in FIG. 9. The controller interrupt flag for the appropriate controller is set in step 190, and the disk semaphore of the driver routine is notified in step 192. The interrupts are enabled in step 194.

Figure 9A:
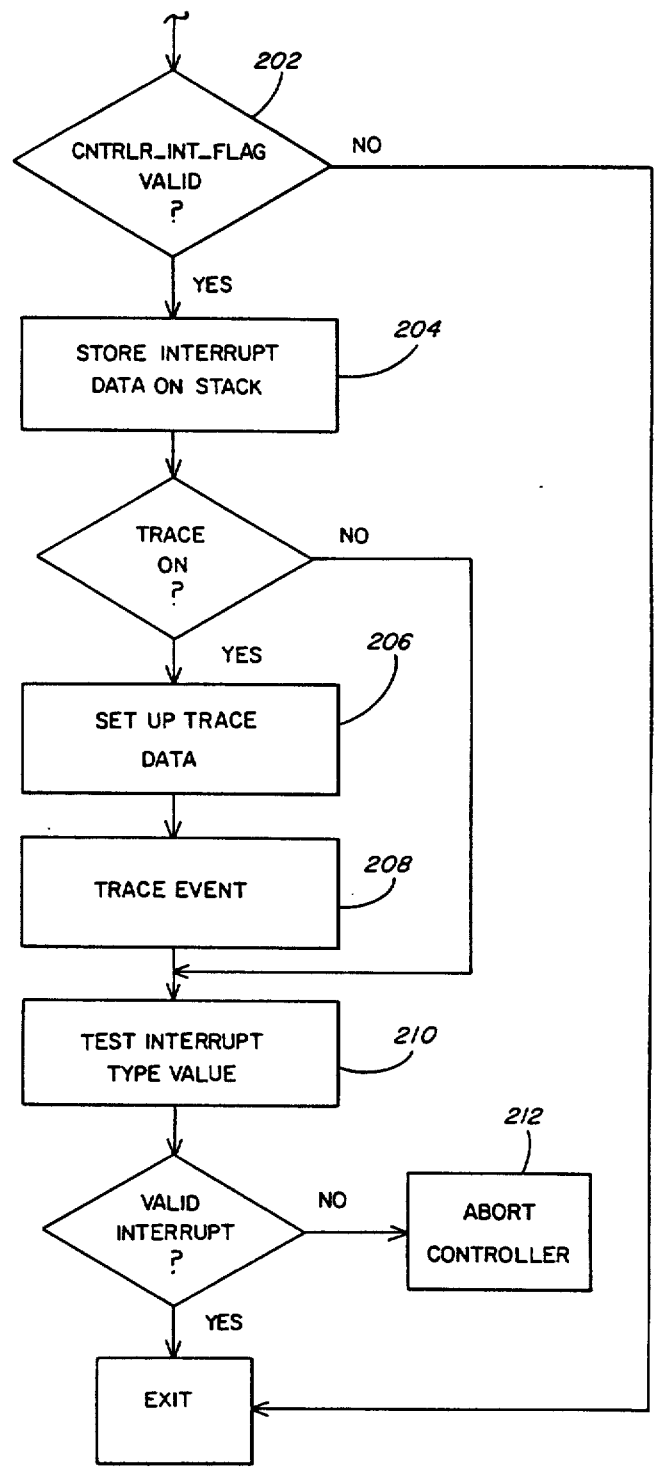
FIG. 9A is a flow diagram illustrating the operation of the GET CONTROLLER STATUS routine.

The GET CONTROLLER STATUS routine is invoked when the disk driver wakes up on a notify. This routine tests the controller interrupt flag and returns the interrupt type, the target ID and a call status. The call status indicates whether or not the status is valid. A flow diagram of the GET CONTROLLER STATUS routine is shown in FIG. 9A. The controller interrupt flag is tested in step 202. When the controller interrupt flag is invalid, the interrupt did not come from the controller. When the controller interrupt flag is valid, the interrupt data is stored on the stack in step 204. When the trace switch is enabled, trace data is set up in step 206, and an entry in the trace table is made in step 208. The value of the interrupt type is tested in step 210. When a valid interrupt is identified, processing of the interrupt proceeds. If the interrupt value is not valid, the controller is aborted in step 212.

The process interrupt routine processes all interrupts that can be generated by the disk controller. The arguments returned by the get status routine are used by this program to vector the correct interrupt handler and search for an active disk request block, respectively. Not all interrupts are the result of user requests being processed by the driver. The disk controller has the ability to generate unsolicited interrupts on its own. These special interrupts do not have a queue block associated with them, and a target ID cannot be used to search for an active queue block. For unsolicited interrupts, the target ID must be zero.

A flow diagram of the spurious interrupt service routine is shown in FIG. 10. When a notify is received and the controller interrupt flag is valid (step 240) but the interrupt status is zero (step 242), a spurious interrupt has been received or the controller did not load the interrupt status correctly. The error is counted in step 244, the controller interrupt flag is reset in step 246 and an OTA 00 is sent to the controller in step 248. When the error count becomes higher than the maximum count allowed (step 250), the disk controller is aborted and a trace table entry is made (step 252).

The spurious interrupt service routine is useful in preventing the system from halting upon receipt of an interrupt, possibly caused by a random event, that does not fall into one of the predetermined categories of interrupts. Instead of the system halting, the spurious interrupt is logged as an error, and normal operation continues. When the number of spurious interrupts exceeds a predetermined maximum allowable value, corrective action, such as reinitializing the system, may be taken.

A flow diagram of the COMMAND, READ interrupt service routine is shown in FIGS. 11A and 11B. After the command block is read by the disk controller, a COMMAND READ interrupt is generated (step 302). The COMMAND READ interrupt service routine in the driver resets the command block available flag in step 304. The work queue is searched in step 306 for the command block having the same ID as the status block associated with the COMMAND READ interrupt. If the specified block is not found (step 308), a fatal error has occurred, and the controller is aborted and a trace table entry is made in step 310. If the block is found, it is included on the pending queue (step 312), removed from the work queue (step 314) and the work queue is checked (step 316) to see if there is more work to be done. If the work queue contains more work, then the disk semaphore is notified in step 318. Then, the controller interrupt flag is reset in step 320, an OTA 00 is sent to the controller in step 322, and the driver routine returns to the main loop for handling the additional work.

When the controller decodes the command block and is ready to receive data from the CPU or send data to the CPU, it requires a set of DMA channels. The controller obtains the DMA channels by interrupting the disk driver with a TRANSFER REQUEST. A flow diagram of the TRANSFER REQUEST interrupt service routine is shown in FIG. 12. The driver sets up the resources and informs the controller which DMA channels can be used. The DMA resources are allocated at cold start time, and the variables that are needed are initialized to their correct values. The driver allocates the data window and sends these values to the controller. The driver is never asked to set up a DMA transfer if one is presently occurring for a different request. Nested DMA requests are illegal. There is one exception to the general rule. The controller can ask to set up DMA transfer for the current block while the current block is being transferred, if an error has occurred during the transfer.

The pending queue is searched in step 402 for the block specified in the status block. If the block is not found, a fatal error has occurred, and the controller is aborted and a trace table entry is made in step 404. If the block is found, a pointer to the request block is sent to the set up I/O routine. This routine sets up the DMA channel registers (step 406), the controller interrupt flag is reset in step 408, and an OTA 00 is sent to the controller in step 410. The OTA 00 acknowledge causes the controller to access the DMA block.

The BUFFER ACQUIRED interrupt occurs on write operations only. It is used to signal the driver that the controller is done with the DMA channels. A flow diagram of the BUFFER ACQUIRED interrupt service routine is shown in FIG. 13. When a BUFFER ACQUIRED interrupt is received, the pending queue is searched in step 502 for the block specified in the status block. If the block is not found, a fatal error has occurred, and the controller is aborted and a trace table entry is made in step 504. If the block is found, the driver frees up the DMA channels in step 506. Then, the controller interrupt flag is reset in step 508, and an OTA 00 is sent to the controller in step 510.

When the COMPLETION interrupt occurs, it is an indication that the identified request was handled correctly by the controller and data has been written to, or read successfully from, the disk. The controller has a built-in retry algorithm. Therefore, the status words are checked, even on a correct completion to see if there were any recoverable errors. If retries were necessary, the interrupt status block reports that a recoverable error occurred. This fact is communicated to the call routine which logs errors by setting up queue block error indicators. The call routine supports four possible error conditions: no error, recoverable error, unrecoverable error and perform error correction code. The only condition of concern when a COMPLETION interrupt is received is the recoverable error. A recoverable error will set the queue block error indicators, causing the call routine to log a recoverable error.

A flow diagram of the COMPLETION interrupt service routine is shown in FIGS. 14A and 14B. The pending queue is searched in step 602 for the block specified in the status block. If the specified queue block is not found, the controller is aborted and a trace table entry is made in step 604. This action is required because the driver should never receive a request ID that it did not send to the controller. When the queue block is found, it is removed from the pending queue in step 606, and the pending queue count is decremented in step 608. The interrupt status data is checked in step 610 to see if there has been any recoverable errors, and the error indicators are set accordingly in step 612 if errors are found. The information from the interrupt status block is moved to the queue block for statistical purposes in step 614. The controller interrupt flag is reset in step 616, an OTA 00 is sent to the controller in step 618, and the user request semaphore is notified in step 620.

When the ERROR interrupt occurs, it is an indication that the queued request was handled incorrectly and has not been written to, or read successfully from, the disk. All no error or recoverable errors are handled by the COMPLETION interrupt routine. The type of unrecoverable error is unimportant at this time. The user determines what action, if any, is to be taken. Since the controller performs all error correction codes automatically, the disk driver is not required to handle that condition. The queue block error indicators are used to signal an error to the call side logging mechanism.

A flow diagram of the ERROR interrupt service routine is shown in FIGS. 15A and 15B. The pending queue is searched in step 702 for the block specified in the status block. If the specified queue block is not found, the controller is aborted and a trace table entry is made in step 704. This action is required because the driver should never receive a request ID that it did not send to the controller. When the queue block is found, it is removed from the pending queue in step 706, and the pending queue count is decremented in step 708. The interrupt status data is checked in step 710 to see if there have been any unrecoverable errors. When unrecoverable errors are found, the error indicators are set accordingly in step 712, and the information from the interrupt status block is moved to the queue block for statistical purposes in step 714. The controller interrupt flag is reset in step 716, an OTA 00 is sent to the controller in step 718, and the user request semaphore is notified in step 720.

The possible types of UNSOLICITED interrupt are as follows: (1) DISK SPIN UP; (2) DISK SPUN DOWN; (3) SELF CHECKPOINT REQUIRED; (4) SELF CHECKPOINT COMPLETED; (5) CONTROLLER REQUIRES WARM START; (6) CONTROLLER ERROR. The action taken for each of these subclasses of UNSOLICITED interrupt are quite different. An UNSOLICITED interrupt is an interrupt that is sent when the controller wishes to notify the driver that an event of interest has occurred. This type of interrupt is not associated with any command, so the status is slightly different, but is reported in the same status block as any other interrupt.

The CONTROLLER REQUIRES WARM START and the CONTROLLER ERROR interrupts always result in the driver aborting the controller and require a new downline load of the controller program. The DISK SPIN UP and DISK SPUN DOWN interrupts are a result of a disk drive being powered up or turned off by external means.

Errors must be reported to the system. However, the call routine has no knowledge of an UNSOLICITED interrupt occurring. The call routine communicates with the driver routine through the disk queue block. For UNSOLICITED interrupts, the driver communicates with the call routine at a different level by means of an error mailbox. The driver posts the UNSOLIC- ITED interrupt status to the mailbox and updates the error mailbox pointers.

The DISK SPIN UP and DISK SPUN DOWN interrupts require only that the event be recorded. These events are logged by posting them to the mailbox.

The SELF CHECKPOINT REQUIRED interrupt is generated when the controller has found an internal error that may be recoverable or an operation is currently in progress that was initiated by the controller. These operations can be file server events, alternate bad spot mapping, etc. Each of these tasks is under the control of the intelligent disk controller, not the CPU. The checkpoint interrupts and the driver checkpoint op code command are means of communicating this information. The SELF CHECKPOINT REQUIRED interrupt tells the disk driver to stop sending commands until the controller determines what is going on and decides whether or not to continue. No new commands are accepted by the controller during this time. A flag is set when the controller sends the SELF CHECKPOINT REQUIRED interrupt and is cleared by the SELF CHECKPOINT COMPLETE interrupt.

In order for the controller to hold off the driver, the controller can fail to respond to the next command block that is sent, and the driver is stalled until a status block is sent. The call routine continues queuing work to the work queues, and the driver handles clock process notifies. If the controller does not respond within the normal timeout period, a normal timeout and warm start are performed. This downline loads the controller and reinitializes the system, thereby clearing up any problem the controller may have had.

The CONTROLLER REQUIRES WARM START and CONTROLLER ERROR interrupts result from the controller detecting a problem beyond its ability to correct or recover from. Any internal software or hardware failure results in one of these interrupts. These interrupts result in the driver aborting the controller and performing a downline load of the controller program.

A flow diagram of the UNSOLICITED interrupt service routine is shown in FIG. 16. The UNSOLICITED interrupt type is identified in step 802. When a DISK SPIN UP or a DISK SPUN DOWN interrupt is received, the information is posted to the mailbox in step 804. When a CONTROLLER ERROR or CONTROLLER REQUIRES WARM START interrupt is received, the controller is aborted and a trace table entry is made in step 806. When a SELF CHECKPOINT REQUIRED interrupt is received, the checkpoint flag is set in step 808. When the SELF CHECKPOINT COMPLETE interrupt is received, the checkpoint flag is reset in step 810.

The RETURN CONTROLLER INFORMATION interrupt is used to supply information regarding the physical disk configuration to the user. The user makes a disk request similar to any other disk request. However, this request does not result in any action from a disk device. Instead, the controller responds directly, the driver treats the request normally and the command block is sent to the controller as any other command. When the controller receives this command, it writes the required controller information into the interrupt status block. The controller then responds with a RETURN CONTROLLER INFORMATION interrupt.

A flow diagram of the RETURN CONTROLLER INFORMATION interrupt service routine is shown in FIG. 17. The pending queue is searched in step 902 for the block specified in the status block. If the specified queue block is not found, the controller is aborted in step 904. When the queue block is found, it is removed from the pending queue in step 906, and the pending queue count is decremented in step 908. The controller information forwarded in the status block is moved to the specified queue block in step 910. The controller interrupt flag is reset in step 912, and an OTA 00 is sent to the controller in step 914.

A flow diagram of the PROCESS USER REQUEST routine is shown in FIG. 18. The command block flag is checked in step 1002. When the command block flag is busy, the PROCESS CLOCK routine is called in step 1004. When the command block flag is not busy, it is set to busy in step 1006. Then, the command block is initialized in step 1008, and the command block is built in step 1010 by inserting the required information. The CPU is set up for output of the command block in step 1012, and the A register is set equal to the command pointer in step 1014. An OTA 10, 11, 12 or 13 is sent to the controller in step 1016.

The PROCESS CLOCK interrupt routine is used to wake up the controller if it hangs up during operation. Every half second the CPU clock notifies the disk driver. When the disk driver tries to service the notify, it either services a waiting user request or falls through the driver process loop to the clock routine. The PROCESS CLOCK routine is also called when a user request cannot obtain a command block buffer. The basic premise for the timeout routine is that a working disk controller should never take more than five seconds to perform a user request under any circumstances. Any timeout results in a controller reset, downline load and restart.

A flow diagram of the PROCESS CLOCK interrupt service routine is shown in FIG. 19. The current time is retrieved in step 1102, and user requests are checked in step 1104 to determine if a timeout has occurred. When a timeout occurs, the controller is aborted, the timeout is recorded and a trace table entry is made in step 1106.

Figure 20B:
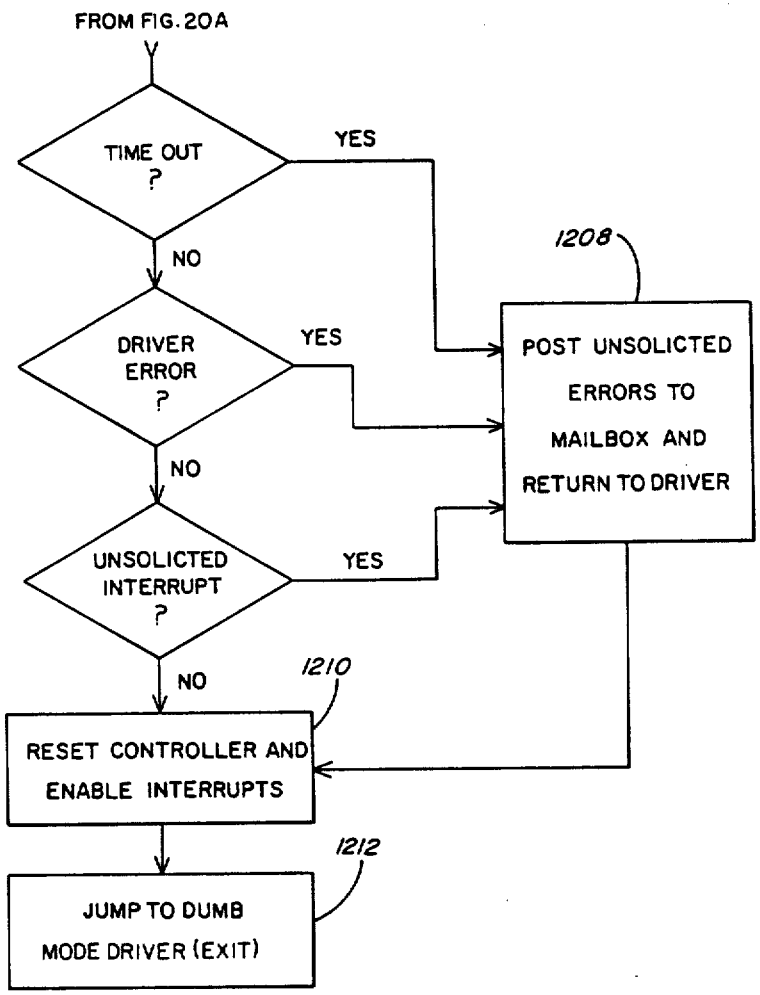

A flow diagram of, the ABORT CONTROLLER routine is shown in FIGS. 20A and 20B. When a fatal error occurs, the interrupts are disabled in step 1202, and the driver is reset to the dumb mode in step 1203. The pending queues are appended to the heads of the associated work queues in step 1204. The type of error that caused the controller to be aborted is identified in step 1206. The error type is posted to the mailbox in step 1208. Then, the controller is reset and the interrupts are enabled in step 1210, and a jump is made to the dumb mode driver in step 1212.

Figure 21:
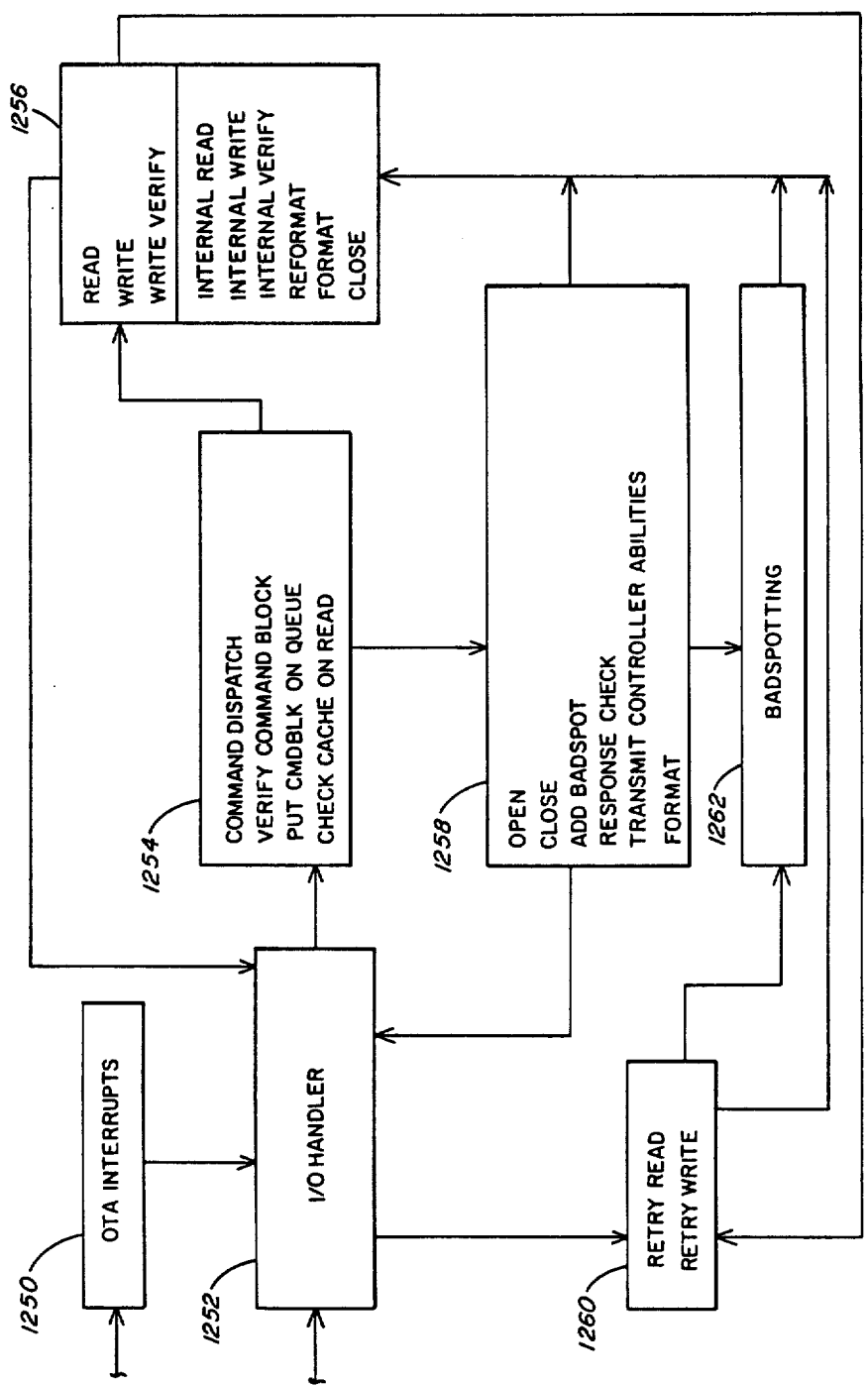
FIG. 21 is a simplified block diagram of a portion of the disk controller program.

A simplified block diagram of the portion of the disk controller program 54 (FIG. 2) that handles communication with the CPU is shown in FIG. 21. An OTA interrupt routine 1250 receives OTA interrupts from the CPU and initiates the necessary action. As described hereinabove, OTA's indicate that a command block is to be read by the controller and also acknowledge interrupts sent by the controller. An I/O handler 1252 carries out all high speed communication with the CPU, including command blocks, status blocks, DMA blocks and DMA transfer of data. A block 1254 responds to commands received from the CPU via the I/O handler 1252 and dispatches commands to the required controller location, verifies that the command block is valid, places the command block on a queue and, when the command is a READ command, checks the cache memory in the controller to determine if the read has already been performed. Commands requiring disk drive operations including READ, WRITE and WRITE AND VERIFY are forwarded to a block 1256 for execution. The block 1256 includes internal operations of the disk controller including internal read, internal write, internal verify, reformat, format and close. Commands not requiring disk drive operations are forwarded to a block 1258 for execution. These commands include OPEN SPINDLE, CLOSE SPINDLE, RESPONSE CHECK, RETURN CONTROLLER INFORMATION and FORMAT. After execution of the command, blocks 1256 and 1258 cause the I/O handler 1252 to interrupt the CPU and forward a status block to the CPU, as described above. A READ or WRITE retry operation may be initiated by the CPU or by a READ or WRITE operation in the controller. A retry is forwarded to block 1260 which causes a bad spot on one of the disks to be mapped out in block 1262.

It will be understood that the controller program illustrated in FIG. 21 is an example of a controller program suitable for the disk control system of the present invention. Any controller program may be utilized provided that it is compatible with the above-described communication protocol.

While there has been shown and described what is at present considered the preferred embodiments of the present invention, it will be obvious to those skilled in the art that various changes and modifications may be made therein without departing from the scope of the invention as defined by the appended claims.

What is claimed is:

1. In a computer system including a central processing unit (CPU) having a main memory, and a disk memory unit interconnected to the CPU, a method for executing user requests for work by the disk memory unit comprising the steps of:
   for each user request received, placing a queue block representative of the user request on a work queue;
   constructing a command block for each queue block placed on the work queue, said command block fully defining the user request;
   forwarding each command block from the CPU to the disk memory unit for execution;
   after each command block has been forwarded to the disk memory unit for execution, transferring the queue block that is representative of the user request from the work queue to a pending queue;
   executing the user requests represented by each command block in an order determined by said disk memory unit; and
   removing each queue block from the pending queue after the disk memory unit has completed the user request.

2. A method as defined in claim 1 wherein said user requests are received in a first order and further including the step of assigning a unique identifier to each user request, whereby said user requests are uniquely identified when they are executed in an order different from said first order.

3. A method as defined in claim 1 further including the steps of:
   constructing a status block indicative of a completed user request, and
   forwarding the status block to the CPU to initiate removal of the queue block that is representative of the completed user request from the pending queue.

4. A method as defined in claim 1 wherein said user requests are received in a first order and wherein the step of forwarding each command block from the CPU to the disk memory unit is performed in said first order.

5. A method as defined in claim 1 further including the steps of:
   monitoring time that each queue block has been on the pending queue and generating an error condition when any queue block has been on the pending queue for longer than a predetermined time, and
   reinitializing the disk memory unit and resuming operation in response to said error condition.

6. A method as defined in claim 5 wherein the step of monitoring time that each queue block has been on the pending queue includes the steps of assigning a maximum allowed completion time to each queue block on the pending queue, and generating said error condition when said maximum allowed completion time is exceeded for any queue block.

7. A method as defined in claim 6 wherein the work queue and the pending queue each have a head and a tail and wherein the step of reinitializing the disk memory unit and resuming operation includes the step of appending queue blocks and in the pending queue to the head of the work queue and initializing the pending queue to zero.

8. A method as defined in claim 1 further including the steps of:
   constructing a status block indicative of a status of a user request that is pending in the disk memory unit,
   identifying the queue block, the command block and the status block for each user request by a unique identifier, and
   forwarding the status block from the disk memory unit to the CPU.

9. A method as defined in claim 8 further including the steps of:
   determining that an unrecoverable error has occurred in the disk memory unit,
   notifying the CPU via an interrupt and the status block that an unrecoverable error has occurred, and
   automatically reinitializing the disk memory unit and resuming operation in response to said unrecoverable error.

10. A method as defined in claim 9 wherein the step of reinitializing the disk memory unit and resuming operation includes the steps of:
    converting from an intelligent mode of operation of said disk memory unit to a degraded mode of operation,
    downloading a disk control program for said intelligent mode of operation from said CPU to said disk memory unit, and
    resuming operation in said intelligent mode of operation.

11. A method as defined in claim 10 wherein the work queue and the pending queue each have a head and a tail and wherein the step of reinitializing the disk memory unit and resuming operation further includes the steps of appending queue blocks in the pending queue to the head of the work queue and initializing the pending queue to zero.

12. A method as defined in claim 8 wherein the step of constructing a command block includes the step of writing command information to a specified location in main memory and wherein the step of forwarding each command block from the CPU to the disk memory unit includes the step of notifying the disk memory unit to read the command information from the specified location in main memory.

13. A method as defined in claim 12 wherein the step of constructing a status block includes the step of writing status information to a specified location in main memory and wherein the step of forwarding the status block from the disk memory unit to the CPU includes the step of notifying the CPU via an interrupt to read the status block from the specified location in main memory.

14. A method as defined in claim 13 including the step of notifying the CPU via an interrupt and the status block that a specified command block has been read from main memory.

15. A method as defined in claim 14 further including the steps of:
checking the work queue for an additional user request each time the CPU is notified that a specified command block has been read, and
when an additional user request is found on the work queue, notifying the CPU to process the user request and forward a command block representative of the additional user request to the disk memory unit, whereby user requests are quickly forwarded to the disk memory unit and the CPU is made available for other work.

16. A method as defined in claim 13 including the step of notifying the CPU via an interrupt and the status block that a specified user request has been completed.

17. A method as defined in claim 13 including the step of requesting the CPU via an interrupt and the status block to set up a data transfer channel when the disk memory unit is ready for transfer of data to or from the disk memory unit.

18. A method as defined in claim 17 including the step of notifying the CPU via an interrupt and the status block that data has been transferred to the disk memory unit.

19. A method as defined in claim 13 including the step of notifying the CPU via an interrupt and the status block that an error has occurred in the execution of a specified user request.

20. A method as defined in claim 13 including the step of notifying the CPU via an interrupt and the status block that an error unrelated to a user request has occurred.

21. A method as defined in claim 13 wherein the step of causing the CPU to read the status block includes the step of notifying the CPU by a vectored interrupt.

22. In a computer system including a central processing unit (CPU) having a main memory, and a disk memory unit interconnected to the CPU, a method for executing user requests for work by the disk memory unit comprising the steps of:
constructing for each user request a command block that fully specifies the user request;
assigning to each command block a unique identifier;
forwarding each command block from the CPU to the disk memory unit;
after forwarding each command block to the disk memory unit, resuming normal operation of the CPU; p1 executing the user request specified by each command block in an order determined by said disk memory unit;
constructing a status block representative of a status of a user request that is pending in the disk memory unit, said status block containing the unique identifier; and
initiating an interrupt and forwarding the status block from the disk memory unit to the CPU.

23. A method as defined in claim 22 further including the steps of:
maintaining in the CPU a record of each command block forwarded to the disk memory unit and a time that the command block was forwarded to the disk memory unit,
deleting the record of each command block when the disk memory unit notifies the CPU that the user request was completed, and
generating an error condition when a period of time since any command block was forwarded to the disk memory unit exceeds a predetermined value.

24. A method as defined in claim 23 further including the step of reinitializing the disk memory unit and resuming operation in response to said error condition.

25. A method as defined in claim 24 wherein the step of maintaining a record of each command block forwarded to the disk memory unit includes the step of placing a queue block representative of the user request on a pending queue when the command block is forwarded to the disk memory unit, the queue block containing the time that the command block was forwarded to the disk memory unit.

26. A method as defined in claim 22 wherein the step of constructing a command block includes the step of writing command information to a specified location in main memory and wherein the step of forwarding each command block from the CPU to the disk memory unit includes the step of notifying the disk memory unit to read command information from the specified location in main memory.

27. A method as defined in claim 26 wherein the step of constructing a status block includes the step of writing status information to a specified location in main memory and wherein the step of forwarding the status block from the disk memory unit to the CPU includes the step of notifying the CPU via an interrupt to read the status block from the specified location in main memory.

28. A method as defined in claim 27 including the step of notifying the CPU via an interrupt and the status block that a specified command block has been read from main memory.

29. A method as defined in claim 27 including the step of notifying the CPU via an interrupt and the status block that a specified user request has been completed.

30. A method as defined in claim 27 including the step of requesting the CPU via an interrupt and the status block to set up a data transfer channel when the disk memory unit is ready for transfer of data to or from the disk memory unit.

31. A method as defined in claim 30 including the step of notifying the CPU via an interrupt and the status block that data has been transferred to the disk memory unit.

32. A method as defined in claim 27 including the step of notifying the CPU via an interrupt and the status block that an error has occurred in executing a specified user request.

33. A method as defined in claim 22 further including the step of notifying the CPU that a predetermined event unrelated to a user request has occurred in the disk memory unit.

34. A method as defined in claim 22 further including the steps of:
- determining that an unrecoverable error has occurred in the disk memory unit,
- notifying the CPU via an interrupt and the status block that an unrecoverable error has occurred, and
- automatically reinitializing the disk memory unit and resuming operation in response to said unrecoverable error.

35. A method as defined in claim 34 wherein the step of reinitializing the disk memory unit and resuming operation includes the steps of:
- converting from an intelligent mode of operation of said disk memory unit to a degraded mode of operation,
- downloading a disk control program for said intelligent mode of operation from said CPU to said disk memory unit, and
- resuming operation in said intelligent mode of operation.

36. In a computer system including a central processing unit (CPU) and a disk memory unit interconnected to the CPU, a method for executing user requests for work by the disk memory unit comprising the steps of:
- constructing for each user request a command block that fully specifies the user request, each command block being assigned a unique identifier number;
- forwarding each command block from the CPU to the disk memory unit for execution in an order determined by said disk memory unit;
- after forwarding each command block to the disk memory unit, resuming normal operation of the CPU;
- requesting the CPU to set up a data transfer channel each time the disk memory unit is ready for transfer of data to or from the disk memory unit;
- transferring data to or from the disk memory unit under control of the disk memory unit; and
- notifying the CPU each time that a user request has been completed.

37. A method as defined in claim 22 further including the steps of:
- making an entry in a trace table for each command block,
- making an entry in the trace table for each interrupt by the disk memory unit, and
- making an entry in the trace table for each error condition, whereby the trace table contains a running record of disk memory unit operations that can be accessed for diagnostic purposes.

38. A method as defined in claim 22 wherein the step of notifying the CPU of the status of a specified user request includes the steps of:
- writing the status block to a specified location in main memory,
- setting a controller interrupt flag in the CPU, and
- notifying a disk semaphore in the CPU that a status block has been written into main memory.

39. In a computer system including a central processing unit (CPU) having a main memory and a disk memory unit interconnected to the CPU, a method for executing user requests for work by the disk memory unit comprising the steps of:
- for each user request received, constructing a command block fully defining the user request;
- forwarding each command block from the CPU to the disk memory unit for execution;
- executing the user requests represented by each command block in an order determined by said disk memory unit;
- notifying the CPU that a specified user request has been completed;
- maintaining in the CPU a record of each command block forwarded to the disk memory unit and a time that the command block was forwarded to the disk memory unit;
- deleting the record of each command block when the disk memory unit notifies the CPU that the user request was completed;
- generating an error condition when a period of time since any command block was forwarded to the disk memory exceeds a predetermined maximum value; and
- automatically reinitializing the disk memory unit and resuming operation in response to said error condition.

40. A method as defined in claim 39 wherein the step of reinitializing the disk memory unit and resuming operation includes the steps of:
- converting from an intelligent mode of operation of said disk memory unit to a degraded mode of operation,
- downloading a disk control program for said intelligent mode of operation from said CPU to said disk memory unit, and
- resuming operation in said intelligent mode of operation.

41. A method as defined in claim 40 wherein the step of maintaining a record of each command block forwarded to the disk memory unit includes the step of placing a queue block representative of the user request on a pending queue when the command block is forwarded to the disk memory unit, the queue block containing the time that the command block was forwarded to the disk memory unit.

42. In a computer system including a central processing unit (CPU) having a main memory and a disk memory unit interconnected to the CPU, a method for executing user requests for work by the disk memory unit comprising the steps of:
- for each user request received, constructing a command block fully defining the user request;
- forwarding each command block from the CPU to the disk memory unit for execution;
- executing the user requests represented by each command block in an order determined by said disk memory unit;
- notifying the CPU that a specified user request has been completed;
- determining when an unrecoverable error has occurred in the disk memory unit;
- notifying the CPU that an unrecoverable error has occurred; and
- automatically reinitializing the disk memory unit and resuming operation in response to said unrecoverable error.

43. A method as defined in claim 42 wherein the step of reinitializing the disk memory unit and resuming operation includes the steps of:
- converting from an intelligent mode of operation of said disk memory unit to a degraded mode of operation,
- downloading a disk control program for said intelligent mode of operation from said CPU to said disk memory unit, and resuming operation in said intelligent mode of operation.

44. In a computer system including a central processing unit (CPU) having a main memory, and a disk memory unit interconnected to the CPU, a method for executing user requests for work by the disk memory unit comprising the steps of:
- for each user request, forwarding a command block that fully specifies the user request from the CPU to the disk memory unit, said command block containing a unique identifier;
- resuming normal operation of the CPU until notified by the disk memory unit of a status of a specified user request;
- executing the user request specified by the command block at a time determined by the disk memory unit; and
- notifying the CPU of the status of the specified user request via an interrupt and a status block containing said unique identifier.

45. A method as defined in claim 44 further including the steps of:
- notifying the CPU via an interrupt and the status block containing said unique identifier to set up a data transfer channel when the disk memory unit is ready for transfer and data, and
- transferring data to or from the disk memory unit under control of the disk memory unit.

46. A method as defined in claim 45 including the step of notifying the CPU via an interrupt and the status block that the specified command block has been read from main memory.

47. A method as defined in claim 45 including the step of notifying the CPU via an interrupt and the status block that the specified user request has been completed.

48. A method as defined in claim 45 including the step of notifying the CPU via an interrupt and the status block that data has been transferred to the disk memory unit.

49. A method as defined in claim 45 including the step of notifying the CPU via an interrupt and the status block that an error has occurred in executing the specified user request.

50. A method as defined in claim 45 further including the step of notifying the CPU that a predetermined event unrelated to a user request has occurred in the disk memory unit.

51. A method as defined in claim 44 wherein the step of forwarding a command block includes the steps of writing command information to a specified location in main memory and notifying the disk memory unit to read the command information from the specified location in main memory.

52. A method as defined in claim 44 wherein the step of notifying the CPU includes the steps of writing status information to a specified location in main memory and notifying the CPU via an interrupt to read the status block from the specified location in main memory.

53. In a computer system including a central processing unit (CPU) having a main memory, and a disk memory unit interconnected to the CPU, a method for executing user requests for work by the disk memory unit comprising the steps of:
- notifying the disk memory unit that a command block representative of a user request is available in the CPU;
- accessing the command block for execution by the disk memory unit; and
- notifying the CPU when the user request represented by the command block has been completed.

* * * * *